United States Patent
Fields, Jr. et al.

(10) Patent No.: US 7,418,541 B2
(45) Date of Patent: Aug. 26, 2008

(54) METHOD FOR INDIRECT ACCESS TO A SUPPORT INTERFACE FOR MEMORY-MAPPED RESOURCES TO REDUCE SYSTEM CONNECTIVITY FROM OUT-OF-BAND SUPPORT PROCESSOR

(75) Inventors: James Stephen Fields, Jr., Austin, TX (US); Paul Frank Lecocq, Cedar Park, TX (US); Brian Chan Monwai, Austin, TX (US); Thomas Pflueger, Leinfelden (DE); Kevin Franklin Reick, Round Rock, TX (US); Timothy M. Skergan, Austin, TX (US); Scott Barnett Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 11/055,404

(22) Filed: Feb. 10, 2005

(65) Prior Publication Data

US 2006/0176897 A1 Aug. 10, 2006

(51) Int. Cl.
*G06F 12/00* (2006.01)
*G05B 13/02* (2006.01)
*G06F 15/00* (2006.01)
*G06F 15/76* (2006.01)

(52) U.S. Cl. .............................. 711/100; 700/36; 712/16

(58) Field of Classification Search ................ 370/402, 370/463; 710/36, 11, 62, 64, 8, 305, 100, 710/110; 711/141, 146, 202, 117, 100, 144, 711/154, 138, 118; 712/1, 10, 11, 16, 32–43
See application file for complete search history.

(56) References Cited

U.S. PATENT DOCUMENTS 4,225,919 A * 9/1980 Kyu et al. .................... 710/305

(Continued)

OTHER PUBLICATIONS

U.S. Appl. No. 11/055,160, Fields, Jr. et al., Method and Apparatus to Operate Cache-Inhibited Memory Mapped Commands to Access Registers, filed Feb. 10, 2005.

(Continued)

*Primary Examiner*—Charles D. Garber
*Assistant Examiner*—Hoang-Chuong Q Vu
(74) *Attorney, Agent, or Firm*—Duke W. Yee; Diana R. Gerhardt; Maria A. Stewart

(57) ABSTRACT

A method and apparatus are provided for a support interface for memory-mapped resources. A support processor sends a sequence of commands over and FSI interface to a memory-mapped support interface on a processor chip. The memory-mapped support interface updates memory, memory-mapped registers or memory-mapped resources. The interface uses fabric packet generation logic to generate a single command packet in a protocol for the coherency fabric which consists of an address, command and/or data. Fabric commands are converted to FSI protocol and forwarded to attached support chips to access the memory-mapped resource, and responses from the support chips are converted back to fabric response packets. Fabric snoop logic monitors the coherency fabric and decodes responses for packets previously sent by fabric packet generation logic. The fabric snoop logic updates status register and/or writes response data to a read data register. The system also reports any errors that are encountered.

1 Claim, 23 Drawing Sheets

U.S. PATENT DOCUMENTS

| | | | | |
|---|---|---|---|---|
| 4,256,926 A | * | 3/1981 | Pitroda et al. | 379/269 |
| 5,347,648 A | | 9/1994 | Stamm et al. | 714/5 |
| 5,490,254 A | * | 2/1996 | Ziegler et al. | 710/100 |
| 5,588,111 A | * | 12/1996 | Cutts et al. | 714/9 |
| 5,822,571 A | * | 10/1998 | Goodrum et al. | 713/400 |
| 5,890,217 A | * | 3/1999 | Kabemoto et al. | 711/141 |
| 6,263,452 B1 | * | 7/2001 | Jewett et al. | 714/9 |
| 6,266,744 B1 | | 7/2001 | Hughes et al. | 711/146 |
| 6,470,429 B1 | * | 10/2002 | Jones et al. | 711/138 |
| 6,484,230 B1 | * | 11/2002 | Konigsburg et al. | 711/100 |
| 6,487,619 B1 | * | 11/2002 | Takagi | 710/105 |
| 6,526,491 B2 | | 2/2003 | Suzuoki et al. | 711/164 |
| 6,591,321 B1 | * | 7/2003 | Arimilli et al. | 710/110 |
| 6,681,293 B1 | * | 1/2004 | Solomon et al. | 711/122 |
| 6,826,656 B2 | * | 11/2004 | Augsburg et al. | 711/144 |
| 2004/0044821 A1 | * | 3/2004 | Myers | 710/306 |
| 2004/0215885 A1 | | 10/2004 | Cargnoni et al. | 711/135 |
| 2004/0215929 A1 | * | 10/2004 | Floyd et al. | 712/16 |
| 2006/0092957 A1 | * | 5/2006 | Yamazaki | 370/402 |
| 2006/0179391 A1 | * | 8/2006 | Rodriguez et al. | 714/749 |

OTHER PUBLICATIONS

U.S. Appl. No. 11/055,675, Fields, Jr. et al., Method for Providing Low-Level Hardware Access to In-Band and Out-of-Band Firmware, filed Feb. 10, 2005.

* cited by examiner

METHOD FOR INDIRECT ACCESS TO A SUPPORT INTERFACE FOR MEMORY-MAPPED RESOURCES TO REDUCE SYSTEM CONNECTIVITY FROM OUT-OF-BAND SUPPORT PROCESSOR

CROSS-REFERENCE TO RELATED APPLICATIONS

The present application is related to co-pending applications entitled "METHOD FOR PROVIDING LOW-LEVEL HARDWARE ACCESS TO IN-BAND AND OUT-OF-BAND FIRMWARE", Ser. No. 11/055,675, published as U.S. Patent Application No. 2006/0179184 and "METHOD AND APPARATUS TO OPERATE CACHE-INHIBITED MEMORY MAPPED COMMANDS TO ACCESS REGISTERS", Ser. No. 11/055,160, published as U.S. Patent Application No. 2006/0179251 all filed on Feb. 10, 2005. All the above applications are assigned to the same assignee and are incorporated herein by reference.

BACKGROUND OF THE INVENTION

1. Technical Field

The present invention relates to low-level hardware access for initialization and run-time monitoring for processor and support chips in a data processing system. Particularly, the present invention provides a method for indirect access to a support interface for memory-mapped resources to reduce system connectivity from out-of-band support processor.

2. Description of Related Art

Traditionally, during the power-on phase of computer systems, central processing units (CPUs) start to execute instructions and initialize the systems into a state from which the operating system can be loaded. In addition to executing user applications, the operating system also runs applications that are needed to keep the system functioning. These applications, also referred to as system-control tasks, are responsible for monitoring system integrity and process any errors that might occur during operation. Usually, there is only one operating-system image controlling all aspects of system management. This type of system control is typically referred to as in-band control or in-band system management.

An exponential growth of computing requirements has resulted in the creation of larger, more complex, systems. Power-on and initialization of these large systems up to the point at which the operating system is fully available can no longer rely only on the system CPU. Instead, systems incorporate "helpers" (e.g., embedded controllers) that facilitate the initialization of the system at power-on. However, during power-on of these complex systems, critical errors can occur, which would prevent loading the host operating system. In the initial case in which no operating system is available, a mechanism is required for reporting errors and performing system management functions. Furthermore, given the diversity of user applications, it is no longer true that one operating-system image controls the entire system. At the high end, today's computer systems are required to run multiple different operating systems on the same hardware. A single instance of an operating system is no longer in full control of the underlying hardware. As a result, a system-control task running on an operating system which is not under exclusive control of the underlying hardware can no longer adequately perform its duties.

As a solution, system-control operations of a large system are moved away from the operating systems and are now integrated into the computing platform at places where full control over the system remains possible. System control is therefore increasingly delegated to a set of other "little helpers" in the system outside the scope of the operating systems. This method of host OS-independent system management is often referred to as out-of-band control, or out-of-band system management. In addition, logical partitioned systems may also run a "hypervisor," which manages multiple logical partitions. This hypervisor is a firmware layer which runs on the CPU (host firmware) and is considered in-band.

Typical servers have associated control structures some of which are composed of "cages." A cage may be a central electronic complex (CEC) cage or an I/O cage. A CEC cage contains a set of CPUs forming an SMP system together with its cache structure, memory and cache control, and the memory subsystem. In addition, the CEC cage may contain an I/O hub infrastructure. A system may contain one or more such cages. A cage may also be an I/O cage, which may facilitate I/O fan-out by linking the I/O cage to a CEC cage on one side and by providing bus bridges for the I/O adapters on another side.

Each CEC or I/O cage may contain an embedded controller which is called a cage controller (CC) or support processor, which interfaces with all of the logic in the corresponding cage and any external components. Sometimes two support processors are used to avoid any single point of failure. The support processors typically operate in master/slave configuration. At any given time, one controller performs the master role while the other controller operates in standby mode, ready to take over the master's responsibilities if the master fails. As a master, the support processor may perform functions, such as:

- At power-on, determine configuration by reading the vital product data (VPD). VPD being a model number, part number, serial number, etc.;
- Initialize the functional hardware to a predetermined state by scanning start-up patterns into the chained-up latches using JTAG (Joint Test Association Group, IEEE 1149.1 boundary scan standard) or other shift interfaces.
- Initiate and control self-tests of the logic circuitry.
- At run-time, monitor and control operating environmental conditions such as voltage levels, temperature, and fan speed, and report any error conditions to system-management entities. In case of critical conditions, directly initiate preventive measures (e.g., emergency power-off) in order to prevent safety hazards.

In order to perform these functions, the embedded controller typically uses one of the following interfaces for intra-cage control:

- I2C bus.
- GPIO (general-purpose I/O, sometimes referred to as digital I/O).
- UART (universal asynchronous receiver/transmitter, usually referred to as serial port).
- JTAG (Joint Test Association Group, IEEE 1149.1 boundary scan standard).

As typical cages may contain many field-replaceable units (FRUs), the cage controller is used to initialize the FRU upon replacement. Each FRU is controlled by multiple interfaces. These interfaces are designed to support features such as upgrading of the configuration of a cage, or "hot-plugging" of FRUs in concurrent repairs. However, in low-end systems, it is sometimes prohibitive to provide the necessary connectivity from the support processor to all the chips in the system. Thus, it is desirable to limit the connectivity to a small subset of the chips, and provide an indirect mechanism to access the remaining chips from this limited subset.

SUMMARY OF THE INVENTION

The present invention provides a method and apparatus for indirect access to a support interface for memory-mapped resources to reduce system connectivity from out-of-band support processor. A computer typically contains multiple processor, cache, I/O hub, and memory chips. The processor chips provide low-level hardware access to remaining chips in the CEC via a support interface. The support processor is connected to the processor chips via an identical support interface to drive a register interface, which in turn provides indirect access to memory-mapped resources on the remaining chips through the support interface on the processor chip so that no direct connection is required from the support processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
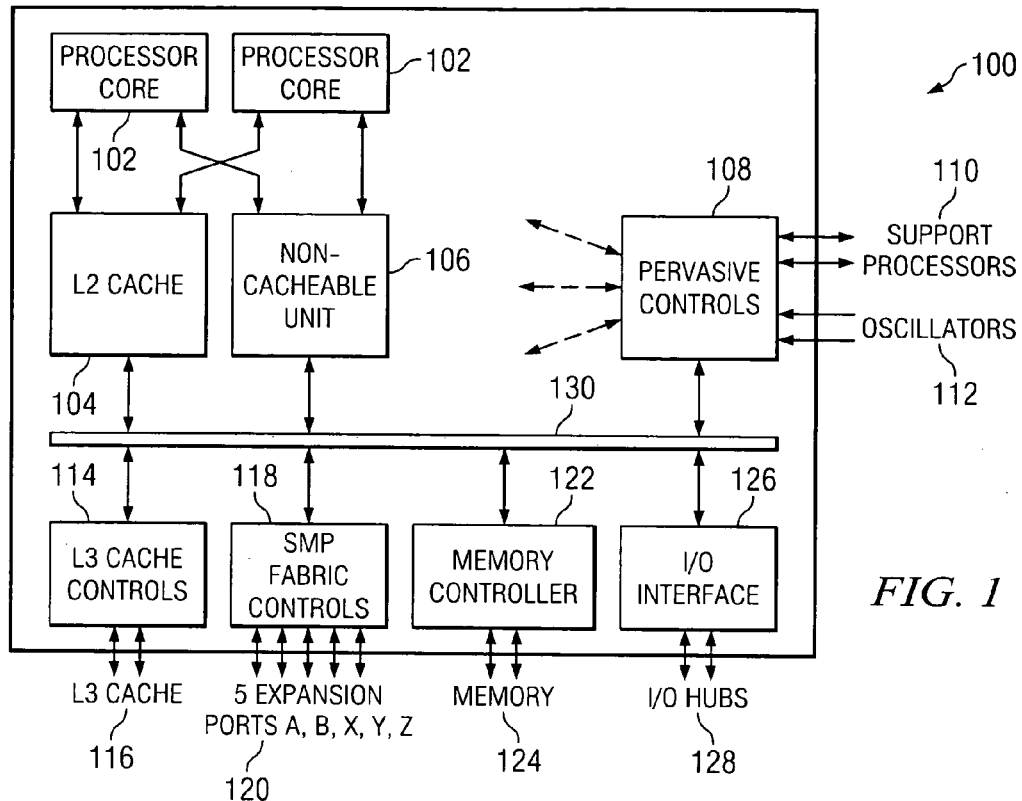
FIG. 1 is a representative processor chip in which the present invention may be implemented.

The present invention provides a method and apparatus for indirect access to a support interface for memory-mapped resources to reduce system connectivity from out-of-band support processors. With this support interface, interconnectivity is reduced from the support processor, allowing a lower-cost support processor and system packaging. FIG. 1 is a representative core processor chip in which the present invention may be implemented. Processor chip 100 may have one or more processor cores 102. Each processor core may be simply referred to as a core. A processor core may have multithreading capability, error detection and recovery functions, numerous general purpose registers (GPR) and special purpose registers (SPR).

In accordance with a preferred embodiment of the present invention, processor core 102 may be connected to level 2 (L2) cache 104 and the non-cacheable unit (NCU) 106. NCU 106 may handle store commands by placing command, address and data received from a processor core 102 onto a fabric bus 130 for storage to main memory. Such stores may alternatively be to memory-mapped I/O or registers. NCU 106 may handle load commands by placing command and address received from a processor core 102 onto a fabric bus 130 for access to memory or memory mapped I/O or registers, and receives returned data from the fabric bus 130. Access to memory that may be susceptible to frequent accesses later may be stored to the L2 cache 104 in order to reduce latency of future operations performed by a processor core 102.

L2 104 may similarly provide access to its contents via the fabric bus 130 which may interconnect to other chips on the same board, and also beyond the board upon which the processor chip 100 is placed. A nearby, but off-chip level 3 (L3) cache 116 may be provided. Controls governing access between the processor core 102 and the L3 cache 116 are in L3 cache controls 114. Similarly, a memory controller 122, and an I/O interface 126 may be provided on-chip to facilitate long-latency access to general memory 124 and to various I/O hubs 128, respectively.

Symmetric multi-processor (SMP) fabric controls 118, is a special purpose device that mediates the contention for the fabric bus 130 by the various attached devices, and provides for SMP topology configuration via expansion ports A, B, X, Y and Z 120. Five expansion ports are shown in the embodiment, however, it is understood that to achieve varying levels of complex multichip topologies, fewer or more expansion ports may be used. It is anticipated that five ports may provide 64 chips with rapid instruction, data and timing signals among them.

Pervasive controls 108 are circuits that exist both outside and mingled within the various processing blocks found on chip. Among the functions of pervasive controls 108 are providing of back-ups to the processor state on each processor core 102 by providing redundant copies of various GPRs and SPRs of each processor core 102 at convenient instruction boundaries of each processor core 102. In addition pervasive controls 108 may assist in the detection of errors and communication of such errors to outside support processors (service processor) 110 for further action by, e.g. out-of-band firmware. It should be noted that the terms "support processor" and "service processor" may be used interchangeably.

Pervasive controls 108 are a gating point for redundant oscillators 112 and provide or receive derivative timing signals. It is appreciated that a fault or other condition may remove one or more redundant oscillators 112 from the configuration, and it is an object of the pervasive controls 108 to select the better timing signal (or at least one that is within tolerances) from among the redundant oscillators 112, and step-encoded signals that may arrive via the expansion ports 120.

Pervasive controls 108 may also contain control state machines for starting and stopping clocks, scanning of Level Sensitive Scan Design (LSSD) latches, and serial communication paths (SCOM) to register facilities, in response to stimulus from support processors 110.

Figure 2:
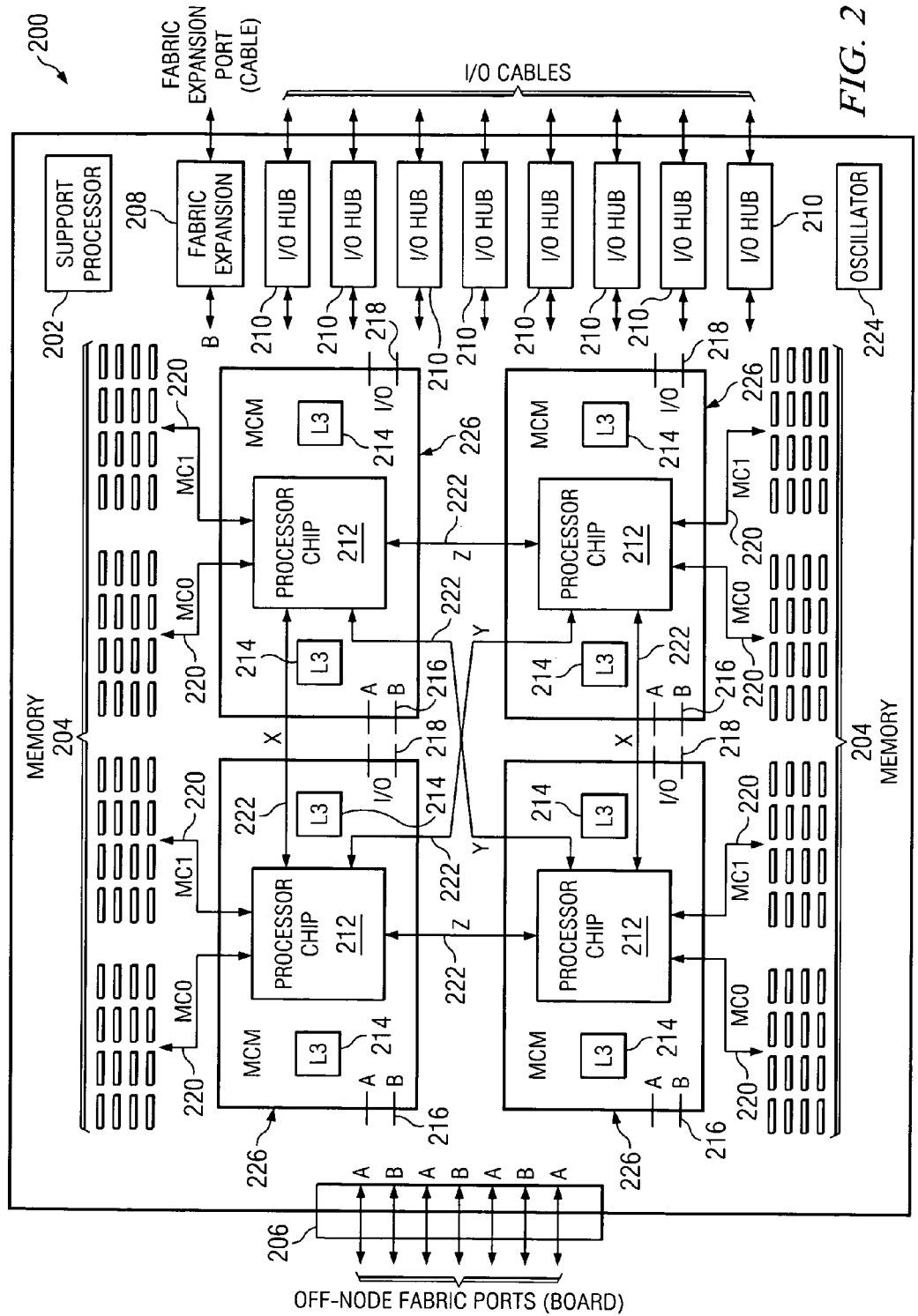
FIG. 2 is an exemplary configuration of a symmetric multiprocessor node in accordance with a preferred embodiment of the present invention.
Figure 3A:
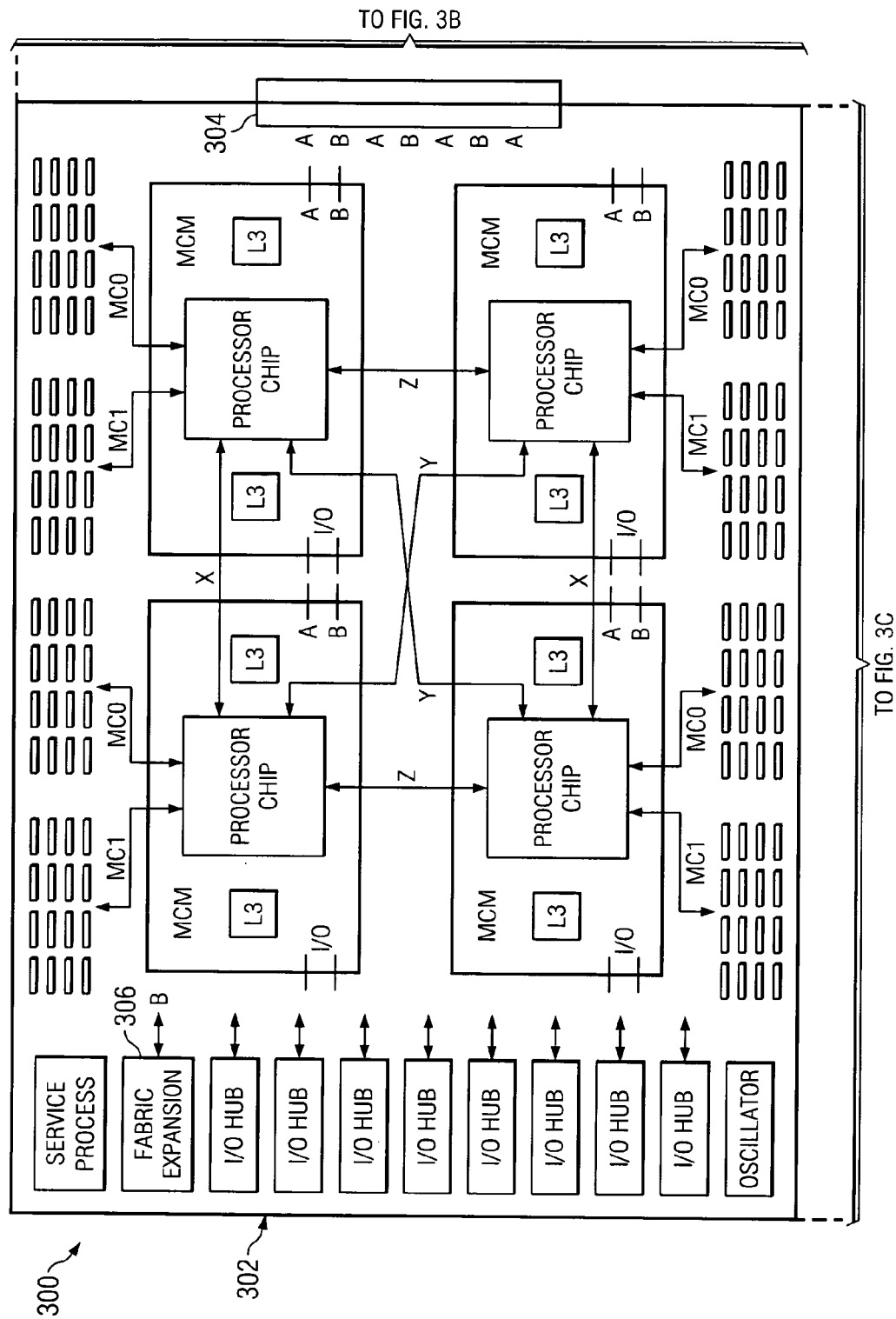
FIGS. 3A-3H represent an exemplary combination of a plurality of processor nodes in accordance with a preferred embodiment of the present invention.
Figure 3B:
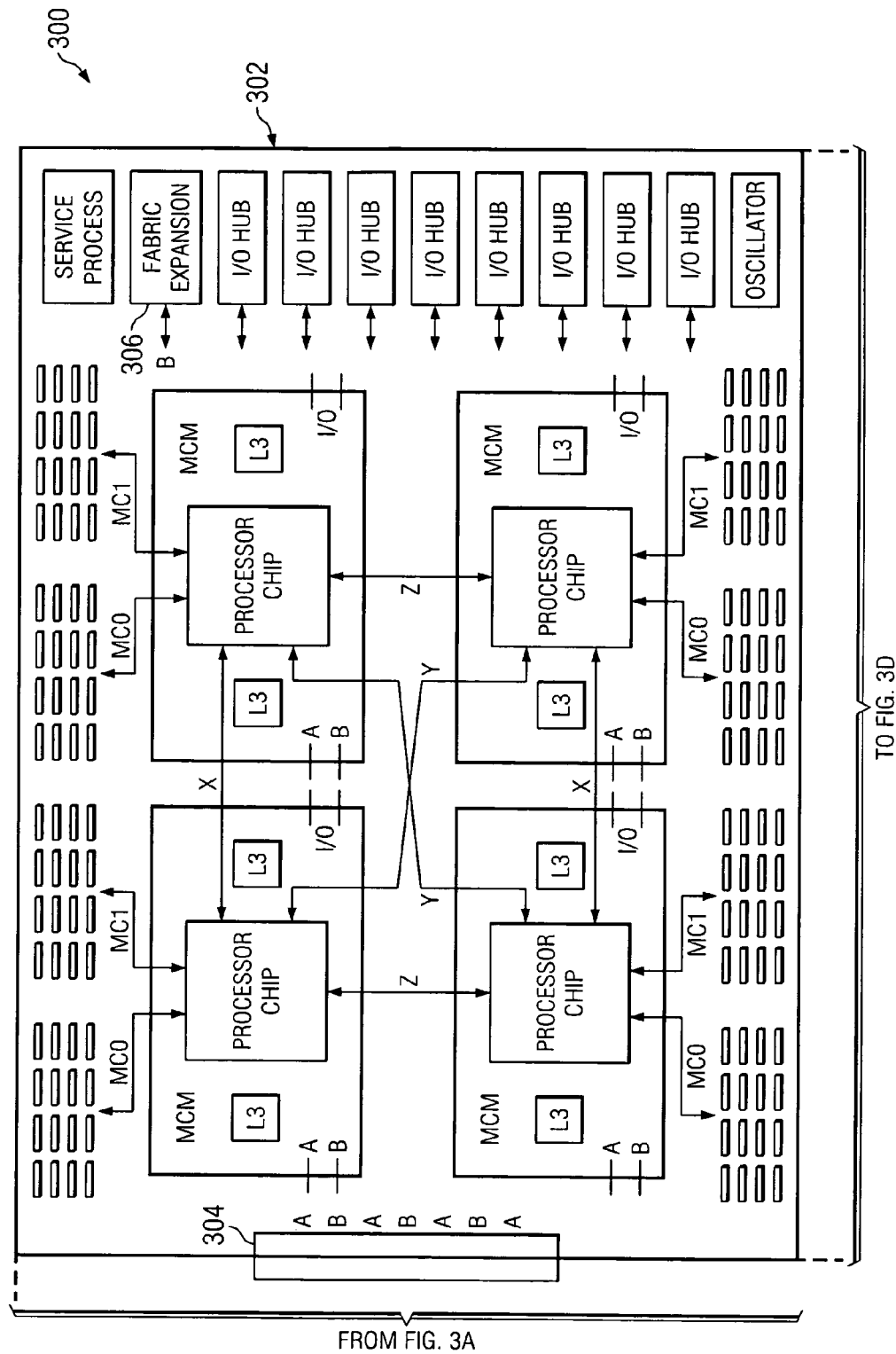
Figure 3C:
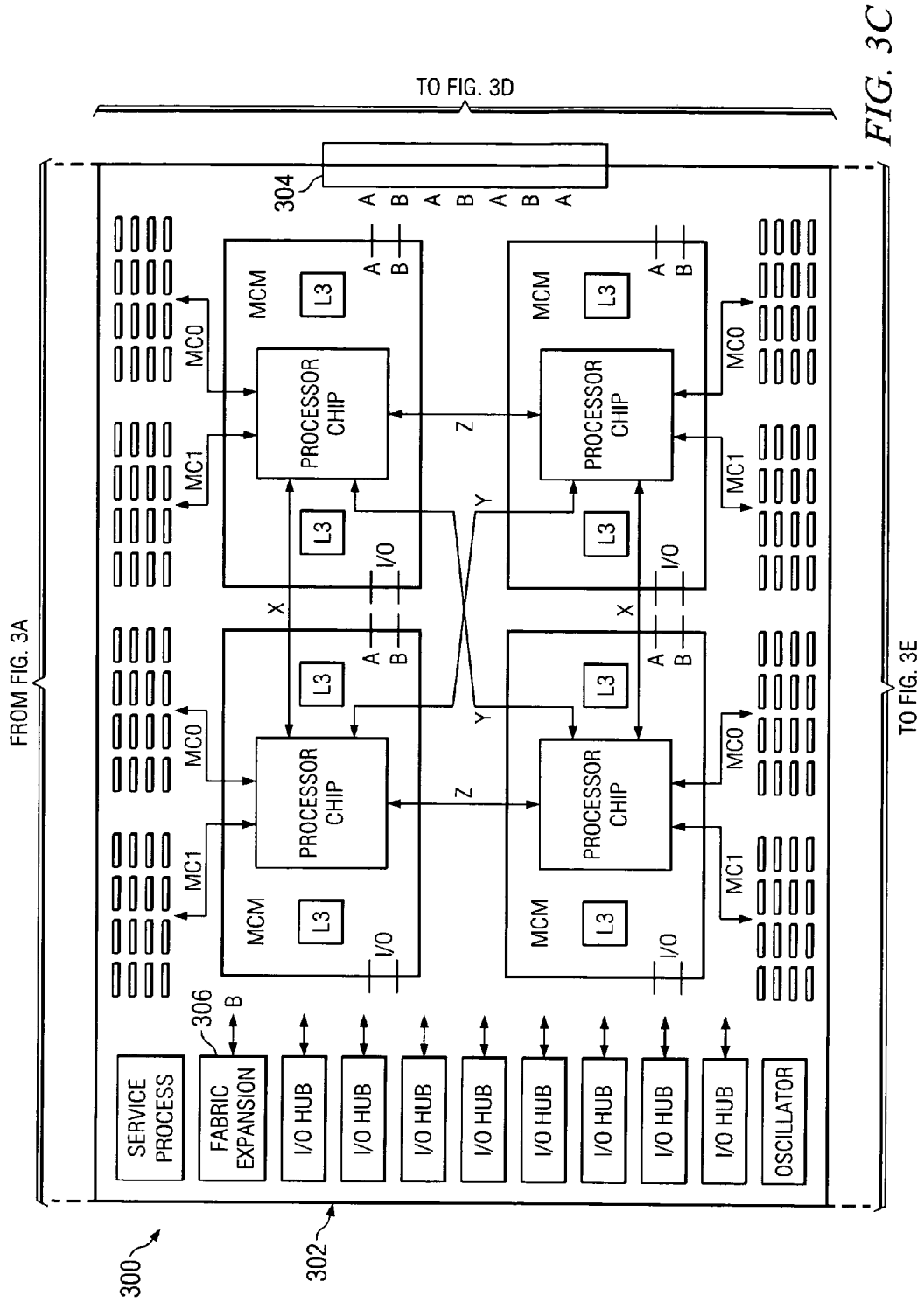
Figure 3D:
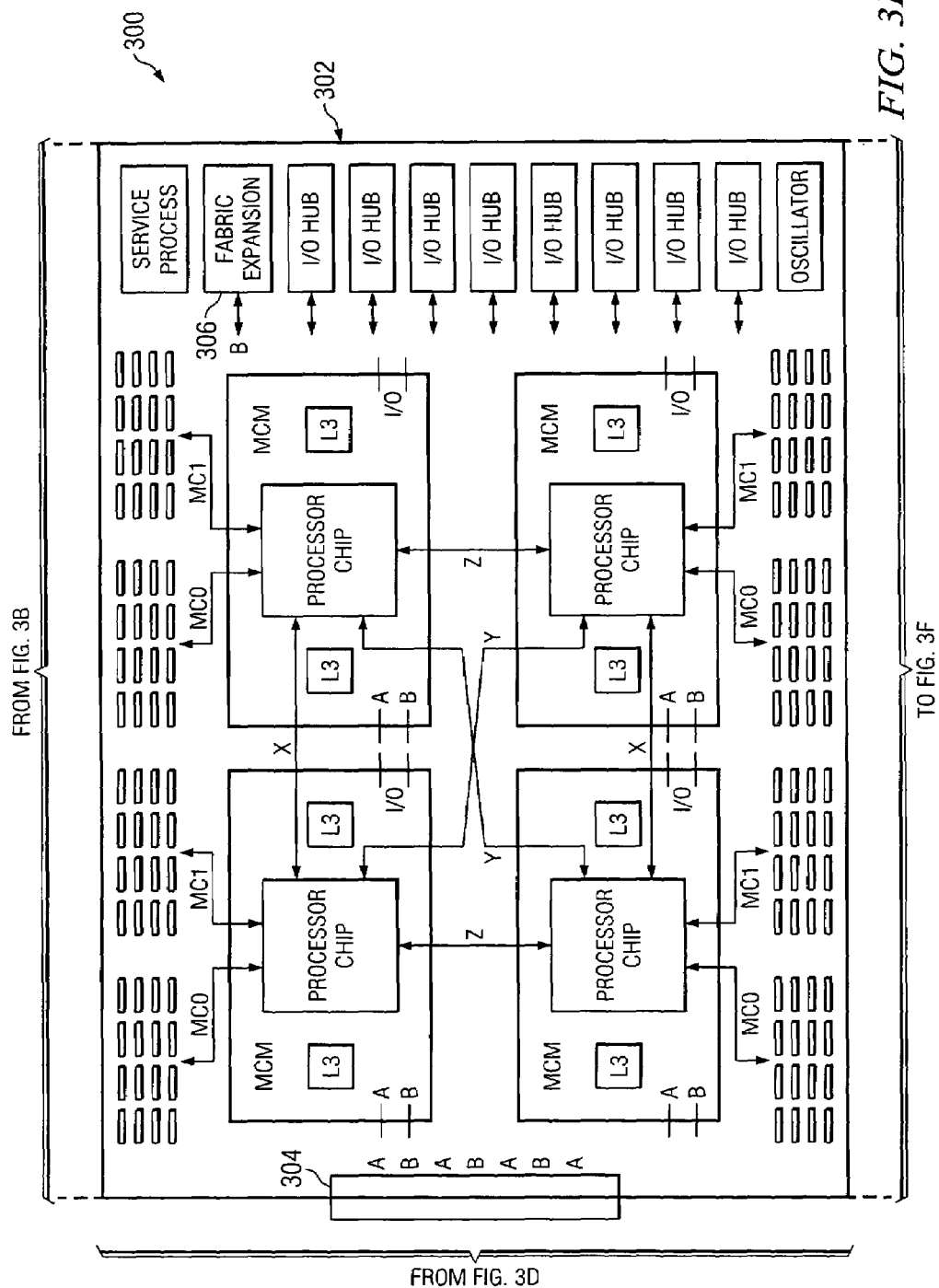
Figure 3E:
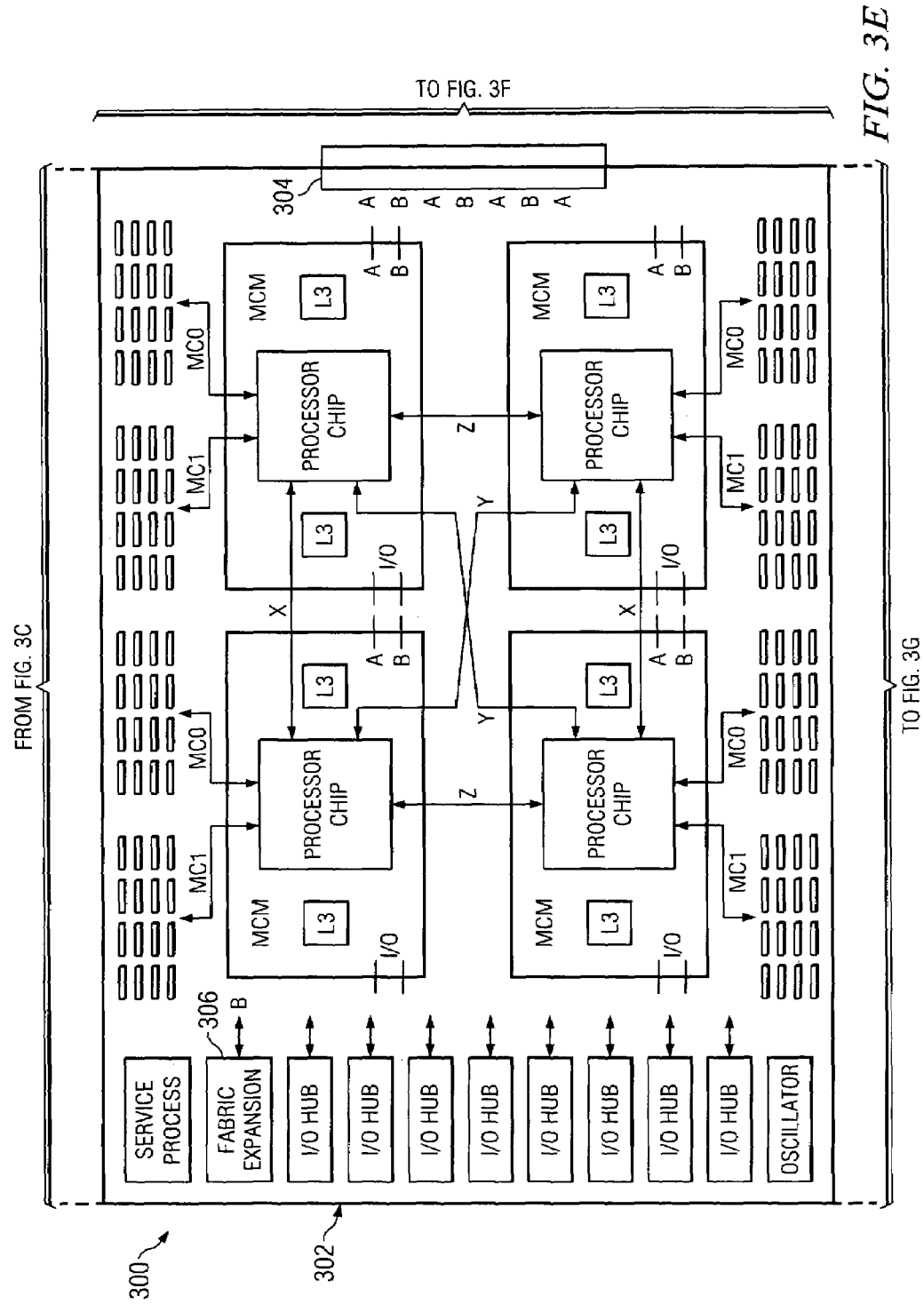
Figure 3F:
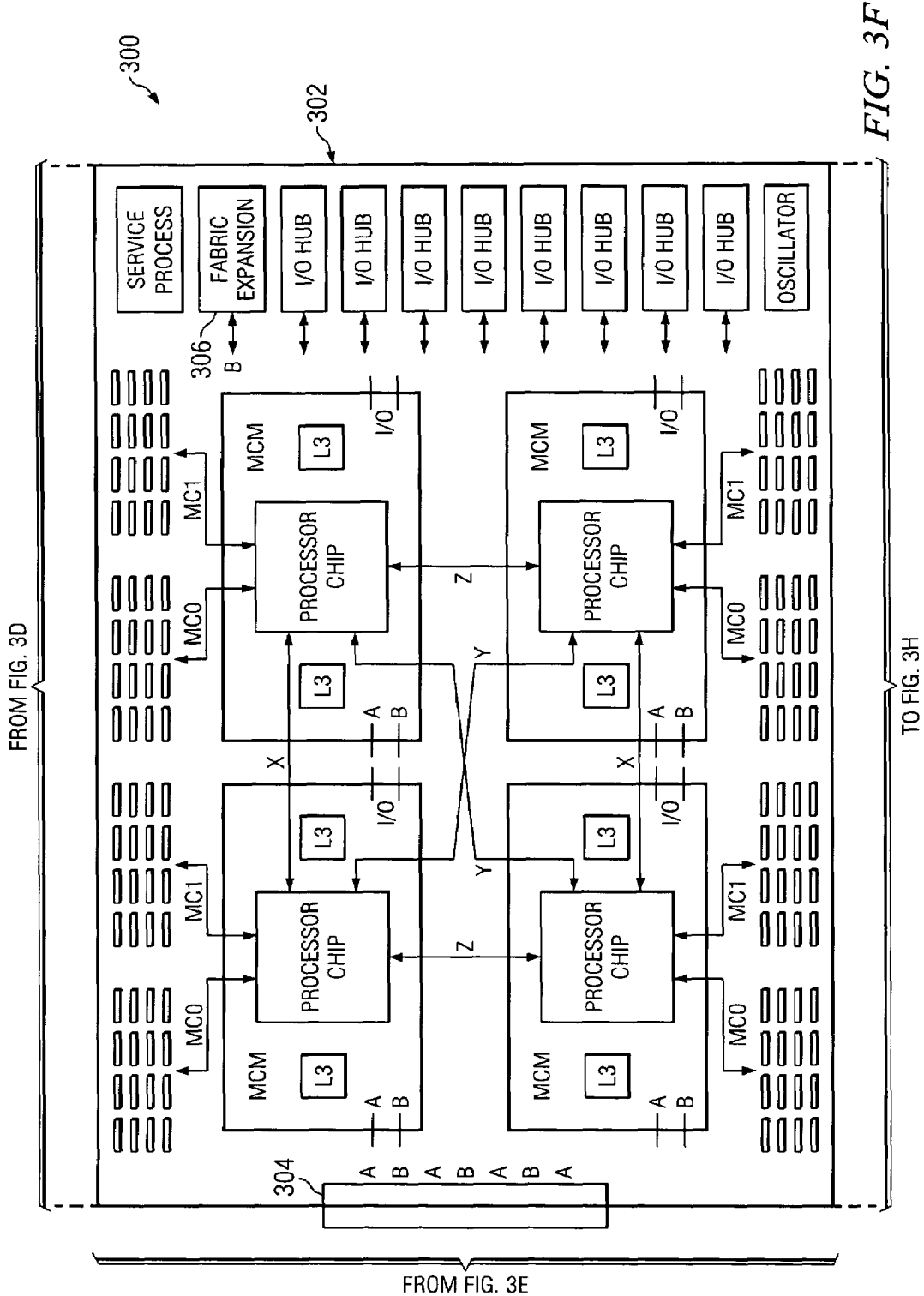
Figure 3G:
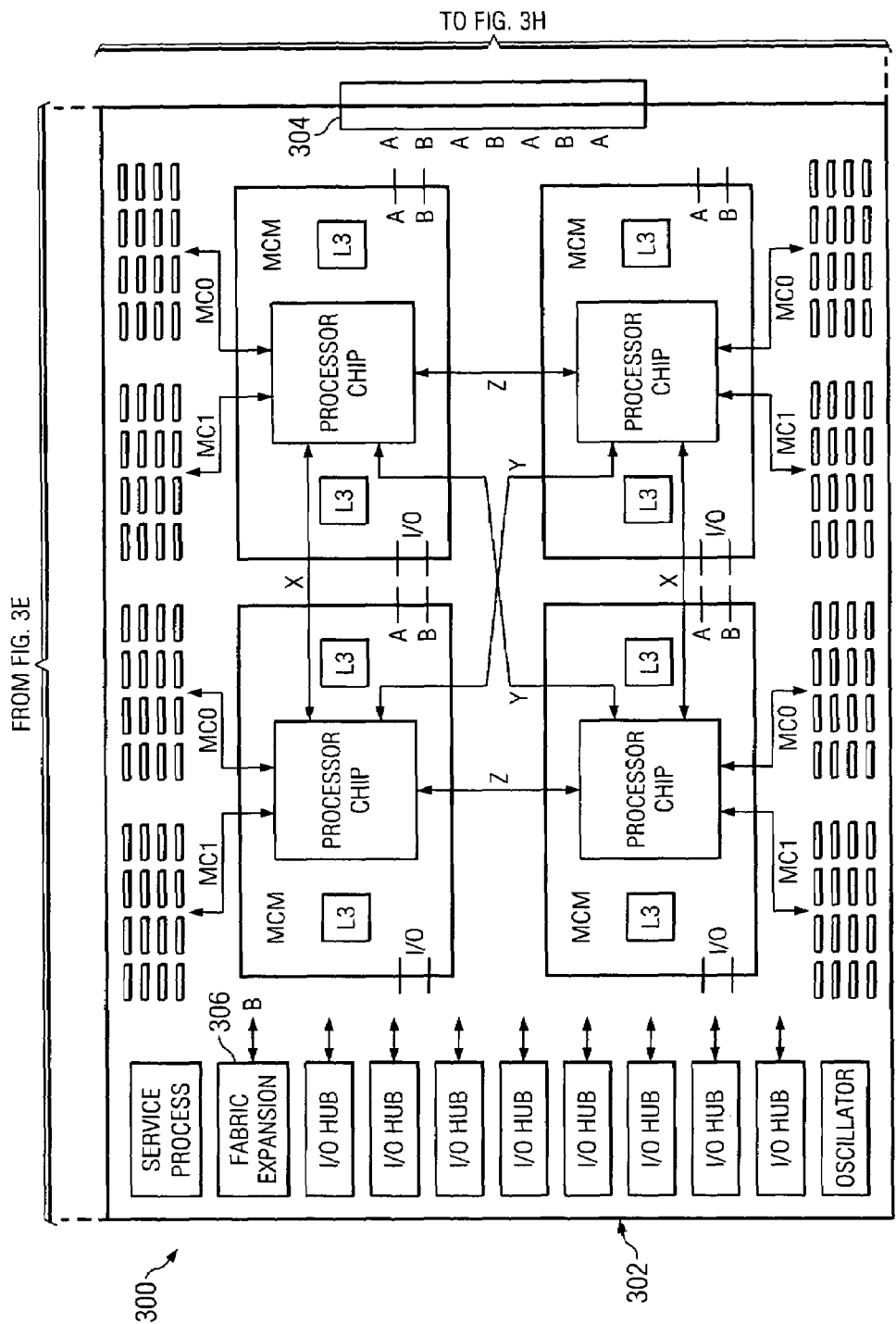
Figure 3H:
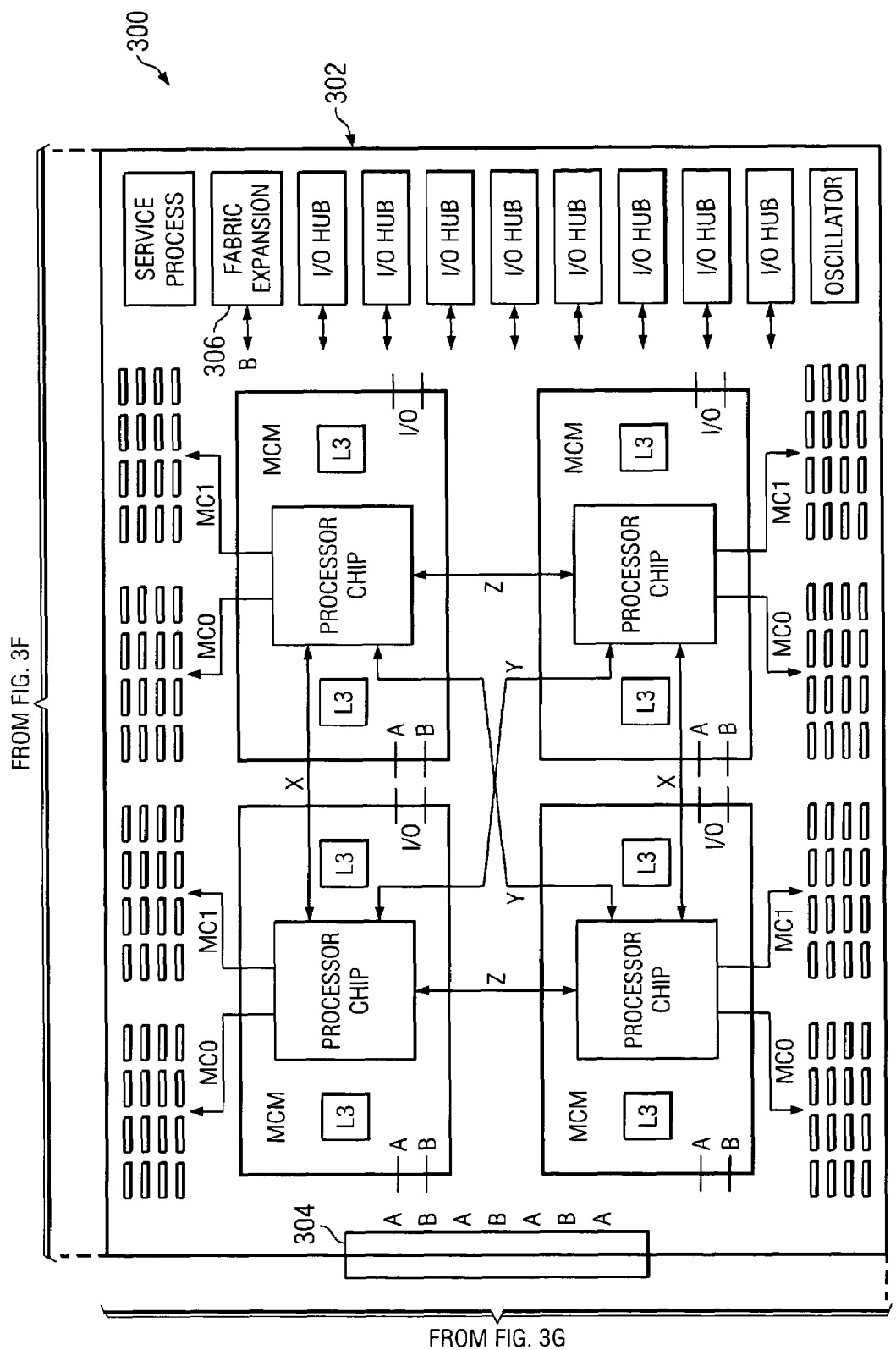

FIG. 2 depicts an exemplary configuration of a symmetric multiprocessor using the core processor chip of FIG. 1 in the form of a processor node 200 and in accordance with a preferred embodiment of the present invention. Processor node 200 may contain one or more service processors 202, memory banks 204, I/O hubs 210, fabric expansion port 208 and off-node fabric expansion ports 206. Fabric expansion port 208 and off-node fabric expansion ports 206 provide connectivity for the A and B ports 216 from each of the multichip modules (MCM) 226 to MCMs on other processor nodes. The fabric ports X, Y, and Z 222 interconnect the MCMs 226 within the same processor node 220. Fabric ports X, Y, Z, A, and B relate to fabric 130, SMP fabric controls 130, and expansion ports 120 from FIG. 1.

Additionally, memory banks 204 are connected to MCM 226 through connections 220 which relate to the connection between memory controller 122 and memory 124 of FIG. 1. Each multi-chip module 226 may be identical in its hardware configuration, but configured by firmware during system initialization to support varying system topologies and functions as, e.g. enablement of master and slave functions or connectivity between various combinations of multiple nodes in a scaleable multi-node SMP system.

Within a particular MCM there may be found core processor chip 212 which relates to processor chip 100 of FIG. 1, as well as L3 cache 214 which relates to L3 cache 116 of FIG. 1. Processor node 200 may have one or more oscillators 224 routed to each chip found on processor node 200. Connections between the oscillators and functional units extend throughout the board and chips, but are not shown in FIG. 2 in order to limit clutter. Similarly, it is understood that many convoluted interconnects exist between the expansion ports 206, 208 and I/O hubs 210 to the various chips on the board, such as the fabric ports 216 and I/O ports 218 of MCM 226, among other components, though such interconnects are not shown in FIG. 2.

In accordance with a preferred embodiment of the present invention, FIGS. 3A-3H depict a combination of a plurality of processor nodes such as processor node 200 of FIG. 2. In this example, on the single board or plane 300, there exist eight processor nodes 302 that are connected through the off-node fabric ports 304 of the individual processor nodes 302. The off-node fabric expansion ports 304 allow the different processor nodes 302 to pass data and commands to other nodes on plane 300. Though not shown, additional planes similar to plane 300 may be interconnected through the fabric expansion ports 306 of the various processor nodes 302.

Figure 4A:
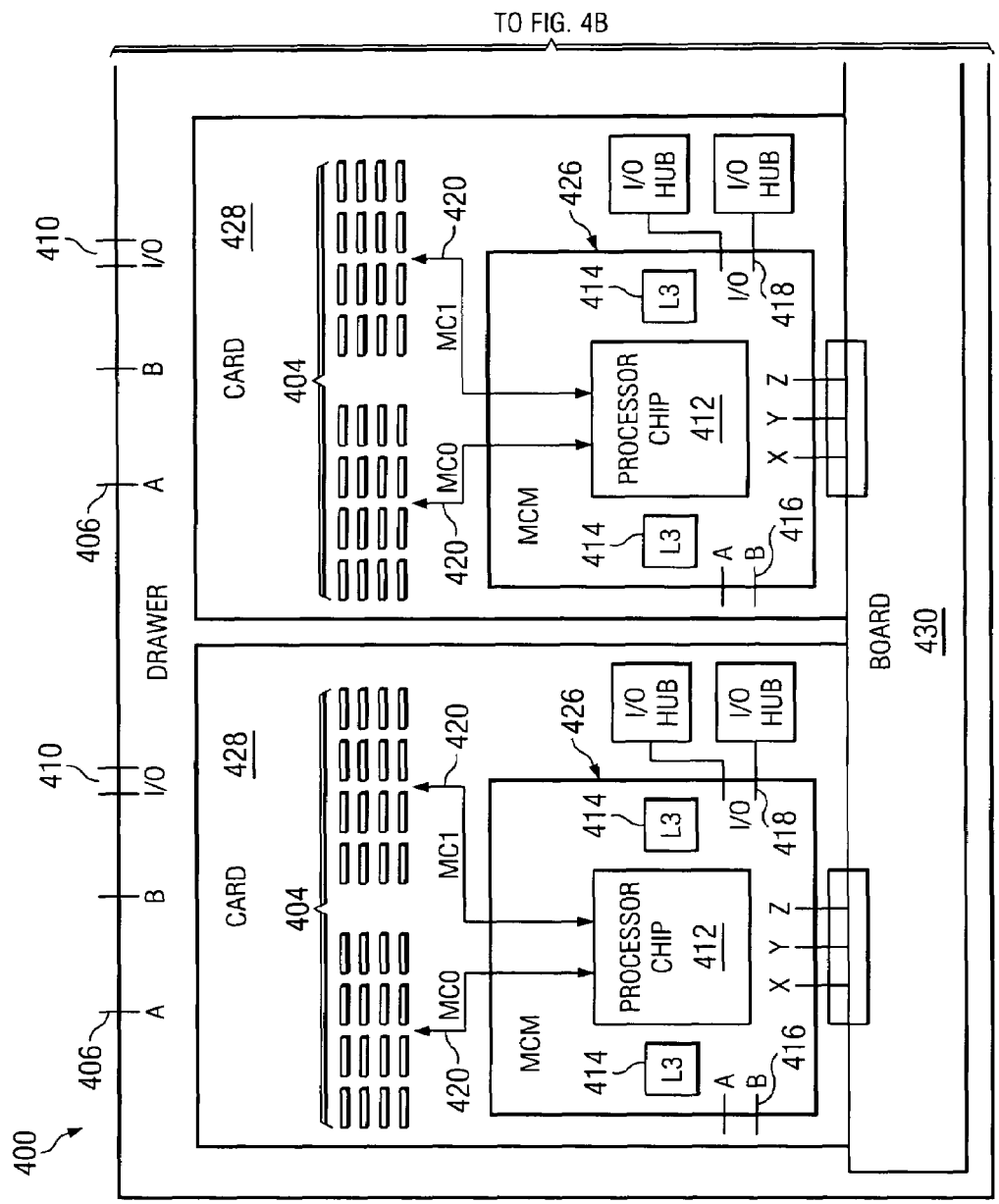
FIGS. 4A-4B represent an exemplary four-node configuration of a symmetric multiprocessor in accordance with a preferred embodiment of the present invention.
Figure 4B:
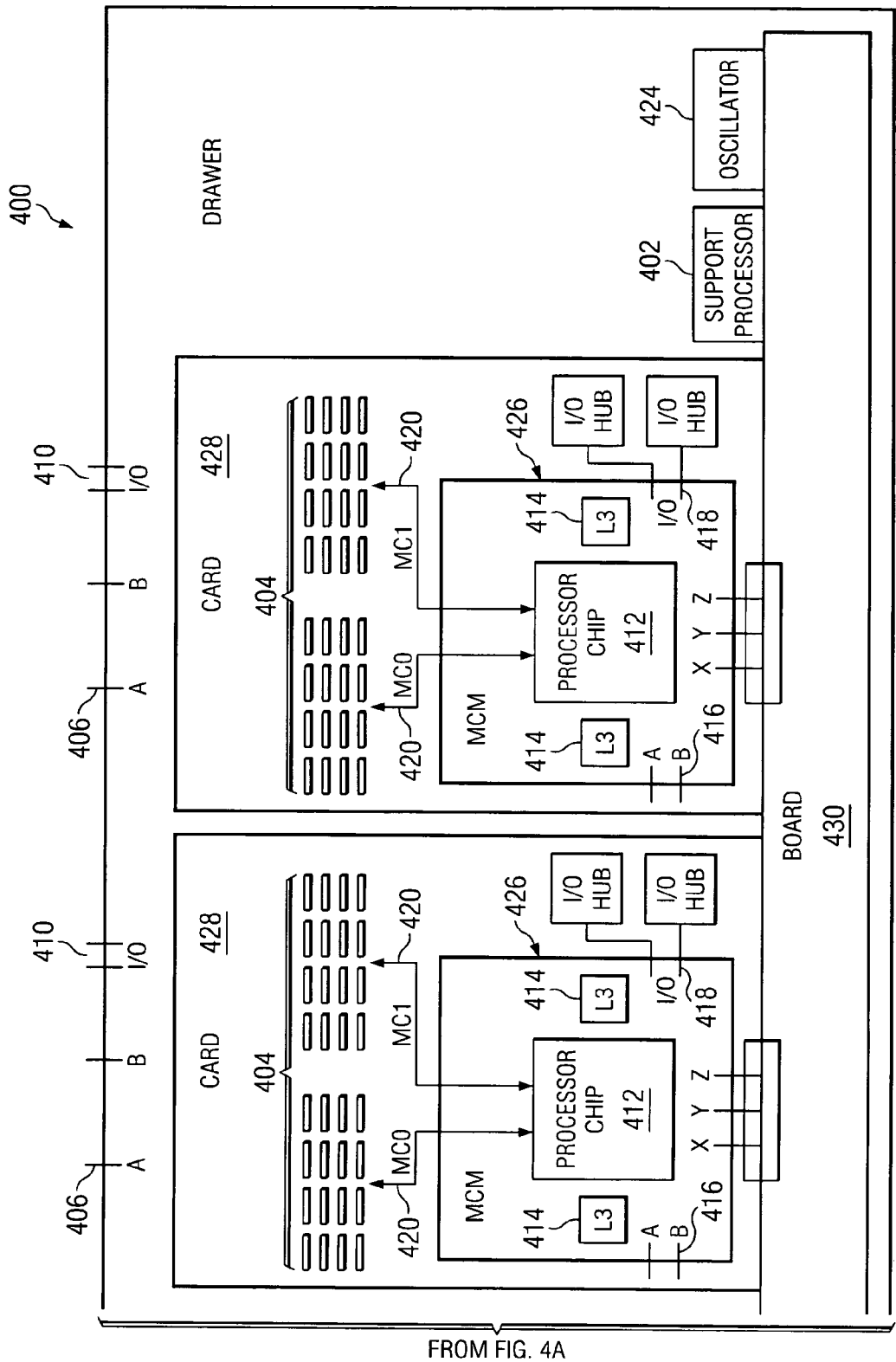

FIGS. 4A-4B depict an exemplary configuration of a symmetric multiprocessor using the chip of FIG. 1 in the form of a processor drawer 400 in accordance with a preferred embodiment of the present invention. Processor drawer 400 may place each MCM 426 on a dedicated card 428 and interconnect among all cards 428 through a board 430. Memory banks 404 are dispersed among cards 428. As shown whit regard to FIG. 2, the MCM 426 of the processor drawer 400 may be identical in hardware configuration but configured by software to have varying topologies and functions within the SMP framework.

Within a MCM 426 may be found the core processor chip 412, which relates to the processor chip 100 of FIG. 1, as well as L3 cache 414 which relates to L3 cache 116 of FIG. 1. I/O hubs 418 may be placed on card 428 with MCM 426 or connected externally through I/O ports 410. Processor drawer 400 may provide service processor supervision with one or more service processors 402 as well as one or more oscillators 424. Service processor 402 and oscillator 424 may interconnect to each card via board 430. Similarly, it is understood that many complex interconnects exist between the expansion ports 406 and I/O hubs 410 to the various chips on the board, such as the fabric ports 416 and I/O ports 418 of MCM 426, among other components, though such interconnects which are not shown in FIG. 4.

The drawer configuration and the node configuration, though physically different and accommodated by varying cabinets, may be logically identical. That is, all chips of each embodiment may be configured to communicate in identical topologies, whether the chips are in the FIG. 2 node arrangement or the FIG. 4 drawer arrangement.

Those of ordinary skill in the art will appreciate that the hardware depicted in FIGS. 1-4 may vary. For example, other internal hardware or peripheral devices, such as flash memory or equivalent non-volatile memory and the like, may be used in addition to or in place of the hardware depicted in FIGS. 1-4. Also, the processes of the present invention may be applied to a single processor data processing system.

Figure 5:
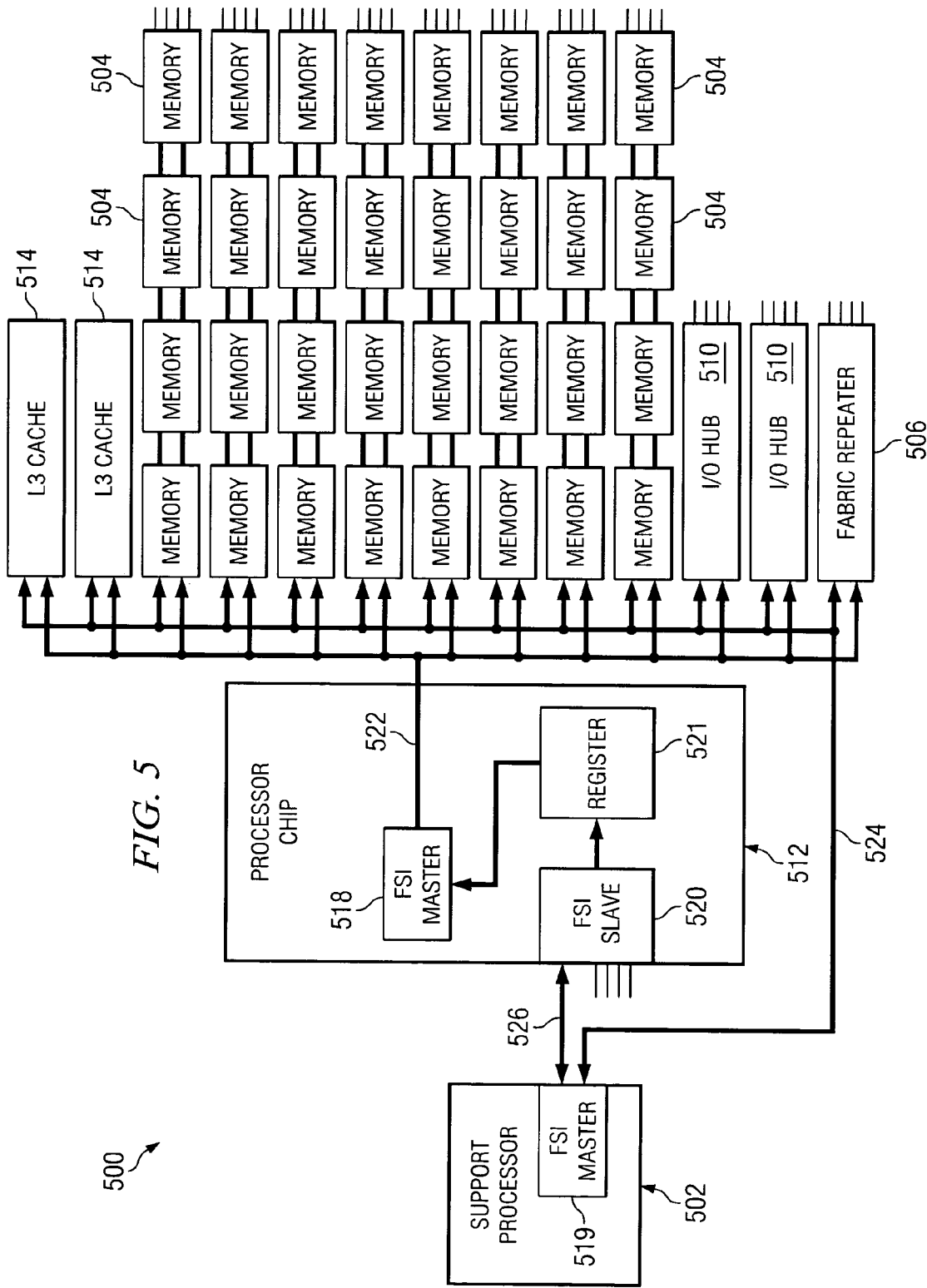
FIG. 5 is high-level diagram of an exemplary support interface topology to a processor chip and support chips in a central electronics complex (CEC) processing node in accordance with a preferred embodiment of the present invention.

With reference now to FIG. 5, an exemplary support interface topology to a processor chip and support chips in a central electronics complex (CEC) processing node 500 is depicted in accordance with a preferred embodiment of the present invention. Support interface topology 500 depicts the interconnection between support processor 502, memory 504, fabric repeater 506, processor chip 512 and L3 cache 514. In accordance with the present invention, each chip 502, 504, 506, 510, 512 and 514 is a field replaceable unit (FRU) and each FRU requires low-level hardware access for initialization and runtime support. The exemplary implementation uses a FRU Support Interface (FSI) 518, 519 and 520, which is a serial bi-directional master-slave interface. Though this implementation is applicable to any number of low-level interfaces, it is not specific to the physical interface itself. Each chip, whether a support processor 502, memory 504, fabric repeater 506, processor chip 512 or L3 cache 514, contains at least one FSI. Although the present invention only mentions a few types of chips, any type of chip with an FSI may be integrated within the topology.

Additionally, the out-of-band support processor 502 and processor chip 512 contains an FSI master 518, 519 and every chip in support interface topology 500 contains at least one FSI slave 520. The FSI master in the processor chip 518 has a register driven interface, or "glue logic" to the memory coherency fabric 130 from FIG. 1. The FSI master 519 in support processor 502 has similar "glue logic" to attach to whatever internal bus is used inside support processor 502 (not shown in diagram), which is typically an industry standard processor local bus (PLB). Processor chip 512 has an FSI slave 520, which is attached to FSI master 519 from support processor 502, shown in connection 526. The other chips 504, 506, 510 and 514 each have an FSI slave, which is attached to FSI master 518 from processor chip 512, shown in connections 522, and support processor 502, shown in connections 524.

Support processor 502 and processor chip 512 use a memory-mapped protocol over the FSI master/slave support interfaces 522, 524 and 526. This memory-mapped protocol is the same for firmware running on the support processor (out-of-band) or the processor chip (in-band). Additionally, support processor 502 may access register interface 521 in the processor chip 512 via FSI connection 526 to indirectly access memory-mapped resources on the other chips 504, 506, 510, and 514 through FSI master 518 on the processor chip 512 via FSI connections 522.

Figure 6:
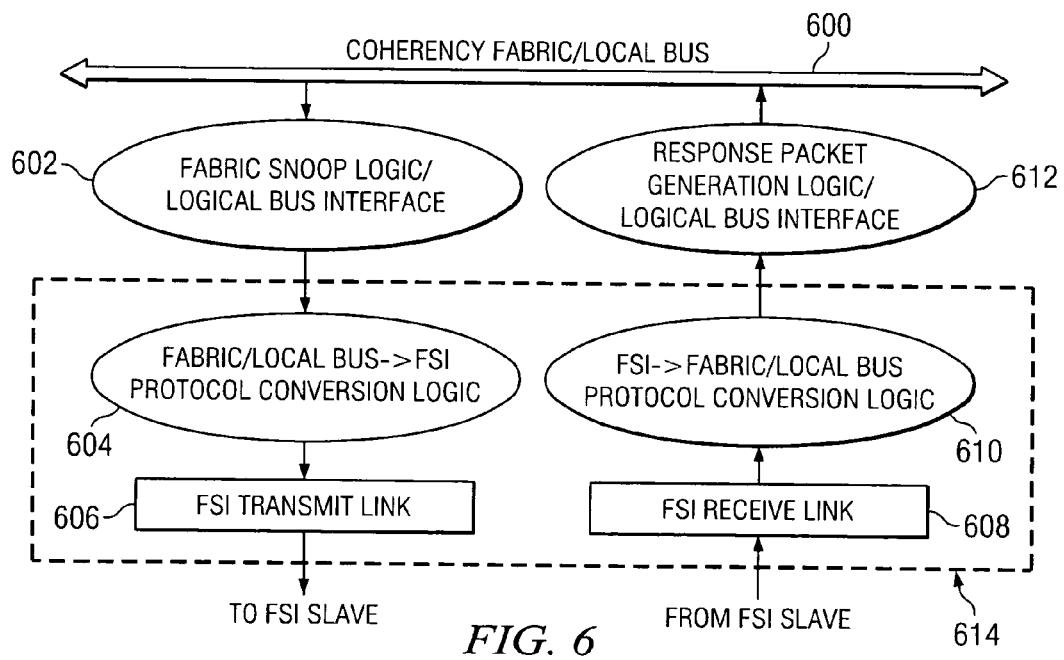
FIG. 6 is a functional block diagram of the field replaceable unit (FRU) support interface (FSI) master in accordance with a preferred embodiment of the present invention.

FIG. 6 depicts a functional block diagram of the FSI master in accordance with a preferred embodiment of the present invention. In this diagram, referring to FSI master 518 on the processor chip 512 from FIG. 5, fabric snoop logic 602 monitors coherency fabric 600 for command packets that target a resource in one of the support chips attached via an FSI link. For FSI master 519 on the support processor 502 from FIG. 5, local bus interface logic 602 monitors the internal local bus 600 of the support processor for command packets that target the processor chip or one of the support chips attached via an FSI link. This monitoring logic 602 includes arbitration in case of multiple command packets on the fabric (or local bus) from different sources to the same target at the same time. Conversion logic 604 converts the information from the fabric (or local bus) packet into an FSI protocol. The FSI command protocol may consist of one or more transfers depending on the target. e.g. a single register or a register interface. Then the FSI command is transmitted via FSI transmit link 606 that drives the physical interface to the FSI slave of the intended chip.

FSI receive link 608 receives response data from the FSI slave of the intended chip. Conversion logic 610 converts the information from the support chip received via the FSI receive link into the fabric (or local bus) protocol. Response packet generation logic (or local bus interface) 612 generates the fabric response packet and returns it on coherency fabric 600. Area 614 denotes that conversion logic 604, FSI transmit link 606, FSI receive link 608, and conversion logic 610 are identical for FSI masters in support processor 502 and processor chip 512 from FIG. 5.

Figure 7:
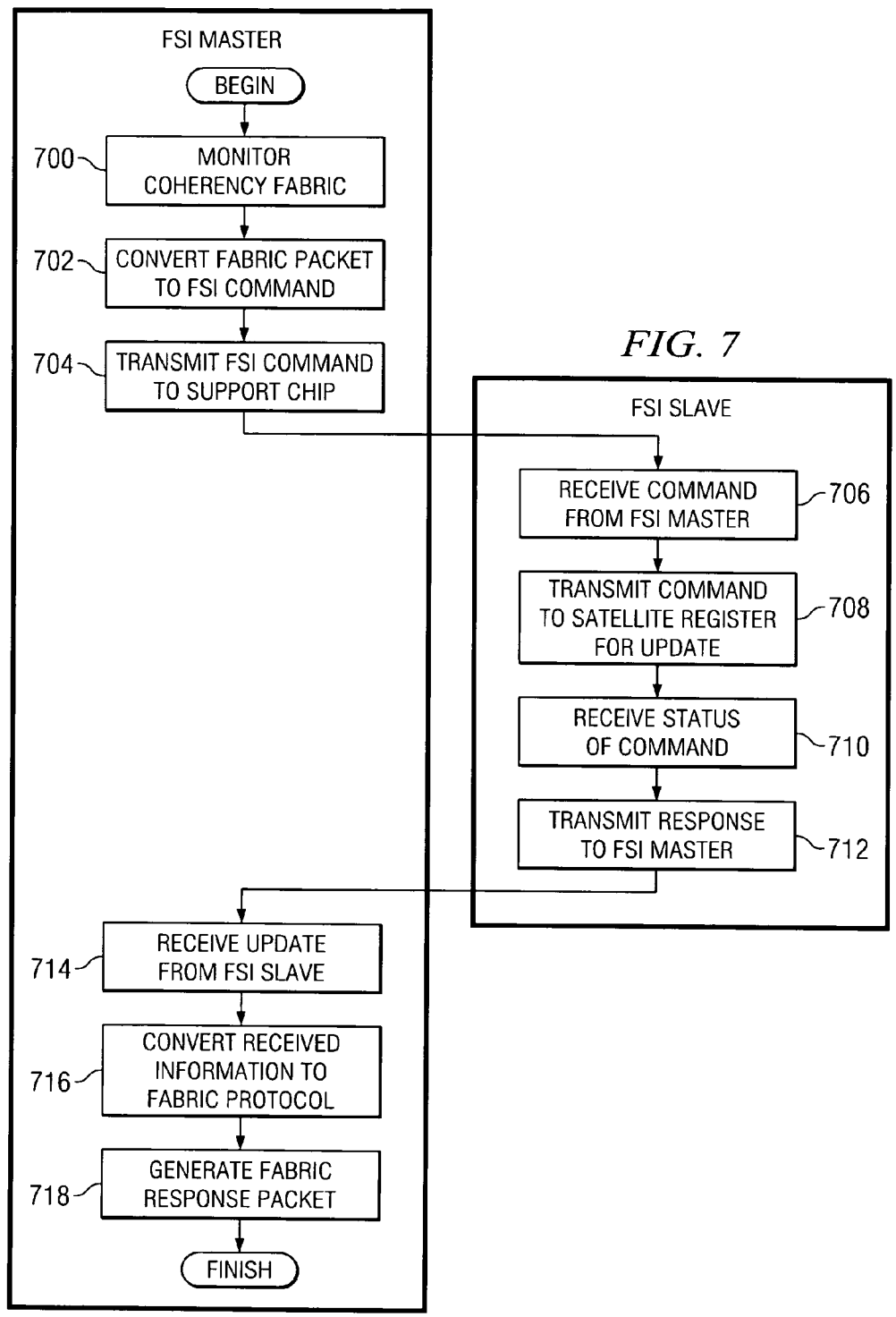
FIG. 7 is an exemplary field replaceable unit (FRU) support interface (FSI) communications flow diagram in accordance with a preferred embodiment of the present invention.

With reference now to FIG. 7, an exemplary FSI communications flow diagram for a processor chip to a support chip is depicted in accordance with a preferred embodiment of the present invention. As the operation starts the FSI master monitors the coherency fabric for command packets, which target a resource in one of the support chips attached to the FSI master via an FSI link (block 700). The fabric packet information is then converted into an FSI protocol (block 702). Then the FSI command is transmitted via an FSI transmit link from the FSI master to the FSI slave of the support chip (block 704). The FSI slave receives the FSI command from the FSI master (block 706) and sends the command to the appropriate register (block 708). If the command is a write (alter), data is also sent with the command (block 708). The actual register update may be performed by "satellite" logic local to the register, where multiple registers share the same satellite logic. Sending the command and data (block 708) may be done serially (one bit at a time across multiple cycles), referred to herein as Serial Communication (SCOM).

The register (or satellite logic) then transmits a response to the FSI slave as a response to command, which the FSI slave receives as a status of the command (block 710). If the command was a read (display), then the response to command also includes data from the targeted register. Again, the response to command may be transmitted serially (SCOM). In turn, the FSI slave responds to the FSI master with a response to the command (block 712). The FSI master receives, via a FSI receive link, the response from the FSI slave of the support chip (block 714). The FSI response in the FSI protocol is converted into FSI packet information (block 716). Finally, a fabric response packet is generated and returned to the coherency fabric (block 718).

FSI Communications flow for a support processor to a processor chip is identical to that depicted in FIG. 7, except the coherency fabric in the FSI master is replaced by a local bus interface.

Figure 8:
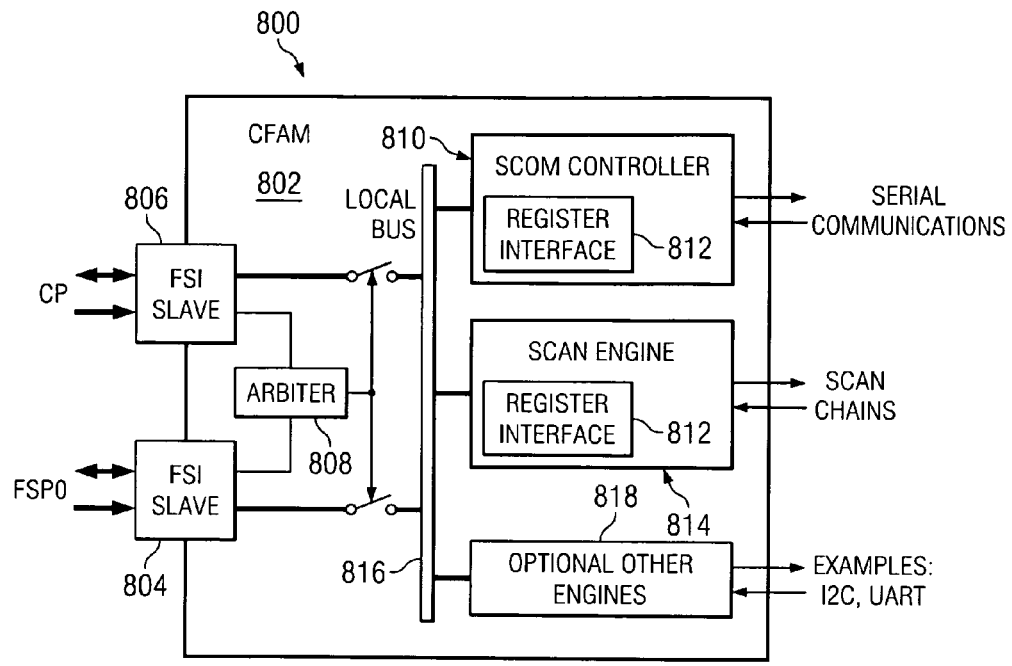
FIG. 8 is an exemplary functional block diagram of a common FRU access macro in accordance with a preferred embodiment of the present invention.

Turning to FIG. 8, an exemplary functional block diagram of a common FRU access macro (CFAM) 800 is depicted in accordance with a preferred embodiment of the present invention. CFAM 802 depicts a macro that is integrated onto every chip. CFAM 802 provides access from support processor 502 and processor chip 512 from FIG. 5. Access for the support processor is through FSI slave 804 and access for the processor chip is through FSI slave 806. Chips with multiple FSI slaves include a hardware arbiter 808 that operates on local bus 816 such that the FSI masters of the support processor and processor chip act independently of each other.

Other than possibly seeing a difference in latency, operations initiated by in-band firmware are transparent to operations initiated by out-of-band firmware and vice-versa. One means of transmitting commands received from the FSI master (block 708 from FIG. 7) is through the internal serial communications port (SCOM) controller 810. SCOM controller 810 is a general purpose serial communications tool that is designed to send a command string and/or file to a serial device, wait for a response, and display the response on the standard output device. SCOM controller 810 provides the flexibility to communicate with a large variety of serial devices, by allowing command options that specify the communication parameters, character handling and modes to be used with each device.

Scan engine 814 provides an easy way to perform scan testing for sequential logic. Though the exemplary aspects of the present invention use scan engine 814 to scan chains, scan engine 814 may also be used to perform clocked scans, multiplexed flip-flop scans, level-sensitive scan-design (LSSD) or partial scans. Both the SCOM controller 810 and scan engine 814 both contain register interface 812. The FSI command protocol includes address, data, and command type information that is loaded into the registers in register interface 812, which triggers the engines to perform the operation designated by the FSI command.

CFAM also allows for additional optional engines 818 to be attached to bus 816. Examples of these engines may be Universal Asynchronous Receiver/Transmitter (UART) which is an integrated circuit used for serial communications, containing a transmitter (parallel-to-serial converter) and a receiver (serial-to-parallel converter), each clocked separately or an I2C Bus, which consists of two active wires and a ground connection. The active wires, called SDA and SCL, are both bi-directional. SDA is the serial data line, and SCL is the serial clock line.

Figure 9:
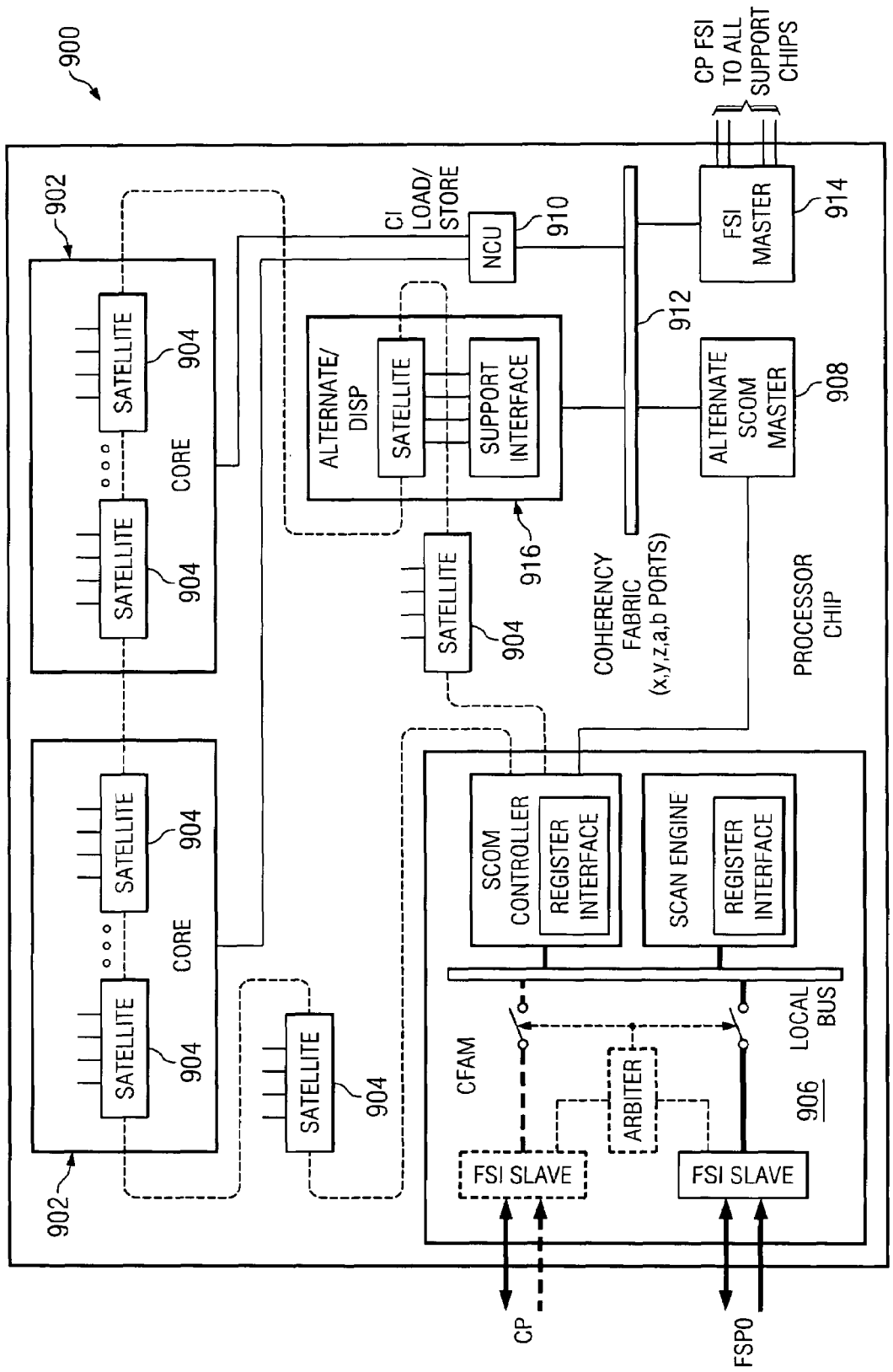
FIG. 9 is an exemplary processor chip and the associated FSI fabric access in accordance with a preferred embodiment of the present invention.

FIG. 9 depicts an exemplary processor chip 900 and the associated FSI fabric access in accordance with a preferred embodiment of the present invention. Processor chip 900 has an integrated CFAM 906 that is the same CFAM integrated on all chips as shown as CFAM 802 of FIG. 8. However, CFAM 906 does not make use of the FSI slave connected to an external processor chip as it is the processor chip and, thus, the arbiter is also not used. Alternate SCOM master 908 provides the access for the SCOM controller of CFAM 906 to send reads and writes, indicated by the lighter dashed line, to be performed to the registers (satellite) 904 across all of the chips on processor chip 900 and other chips connected to fabric bus 912. System coherency fabric 912 is a simplified representation relating to fabric bus 130, SMP fabric controls 118, and expansion ports 120 of FIG. 1. Processor chip 900 also includes processor cores 902 and non-cacheable unit 910 which relates to processor core 102 and non-cacheable unit 106 of FIG. 1. Processor chip 900 further includes FSI master 914 and alter/display 916. FSI master 914 relates to FSI master 518 of FIG. 5 and performs the operations as described with regard to FSI master 518.

Alternate SCOM master 908, FSI master 914 and alter/display 916 are all part of the pervasive controls 108 as shown in FIG. 1. With a preferred embodiment of the present invention, the alter/display 916 has an integrated register interface that contains a set of registers which can be written directly (via SCOM) from the support processor, which is connected through the FSI slave of CFAM 906. The set of registers of alter/display 916 in turn generate load/store commands to system coherency fabric 912 to route to any processor chip on any processing node attached to the coherency fabric through the expansion ports 120 of FIG. 1, in order to access memory or any memory-mapped register or resource in the system.

Although not shown, the load/store commands on the coherency fabric 912 can target satellite registers 904 anywhere in the system, including chips such as attached cache 116, I/O hubs 128, and memory 124 or other chips connected via FSI topology 522 of FIG. 5. Thus, the FSI master in the support processor or processor chip 900 allows portability of firmware between the out-of-band and in-band control structures. Also, the alter/display 916 allows indirect access via the coherency fabric to all chips in the system from the support processor, eliminating the need for direct FSI connections from the support processor to all support chips. These various methods of issuing load/store commands are shown in FIGS. 13-17.

Figure 10:
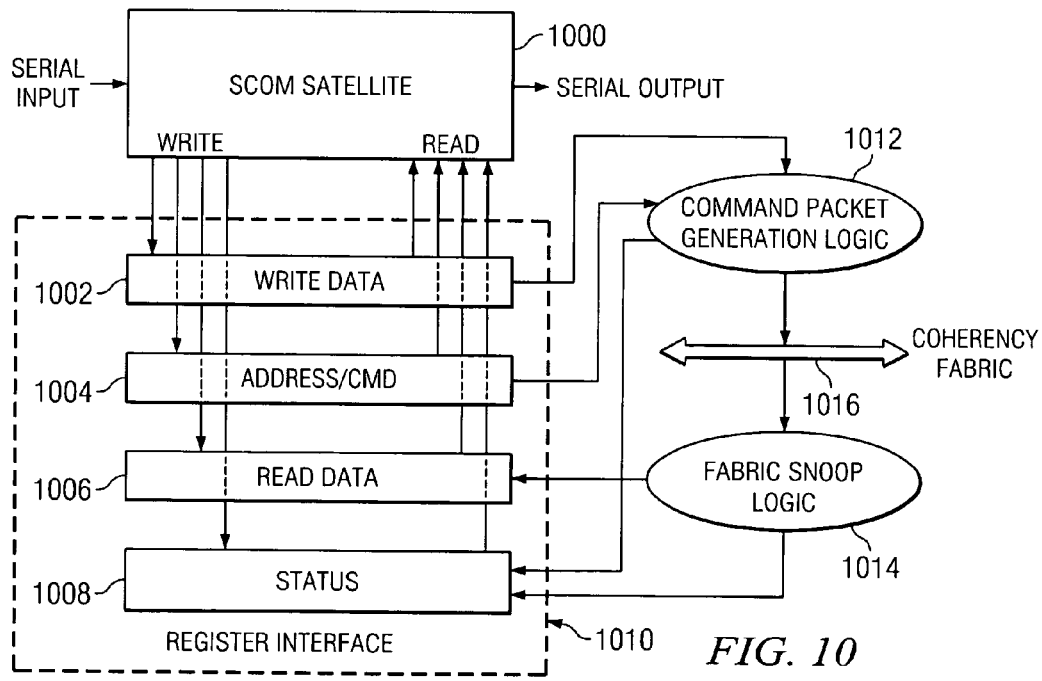
FIG. 10 is a functional block diagram of the alter/display register interface to the coherency fabric in accordance with a preferred embodiment of the present invention.

FIG. 10 depicts a functional block diagram of the alter/display logic in accordance with a preferred embodiment of the present invention. Alter/display logic is used to write (alter) or read (display) any resource that is accessible by a coherency fabric. Exemplary resources include any memory, memory-mapped registers or memory-mapped resource. The protocol for the coherency fabric uses a command "packet" and a response "packet." A command packet consists of an address and a command for read and writes, and data for write commands. A response packet consists of status to read and writes, and data for read commands. In this diagram SCOM satellite 1000 receives serial input from and forwards serial output to the SCOM controller. The SCOM satellite 1000 accesses the registers in the register interface 1010.

In response to a write to the address/command register 1004, fabric packet generation logic 1012 generates a fabric packet from write data 1002 and address/command registers 1004. Fabric packet generation logic 1012 initiates the fabric packet on the coherency fabric 1016 and updates the status register 1008 to indicate that the fabric packet has been sent. Write data is only required if the command is an "alter" command. Fabric snoop logic 1014 monitors coherency fabric 1016 and decodes responses for fabric packets previously sent by fabric packet generation logic 1012. Fabric snoop logic 1014 writes response data to read data register 1006 if the associated command was a "display" command, and updates the status register 1008 to indicate that the response packet has been received and whether or not data is available in the read data register 1006, as well as if any errors were reported for the command.

Figure 11:
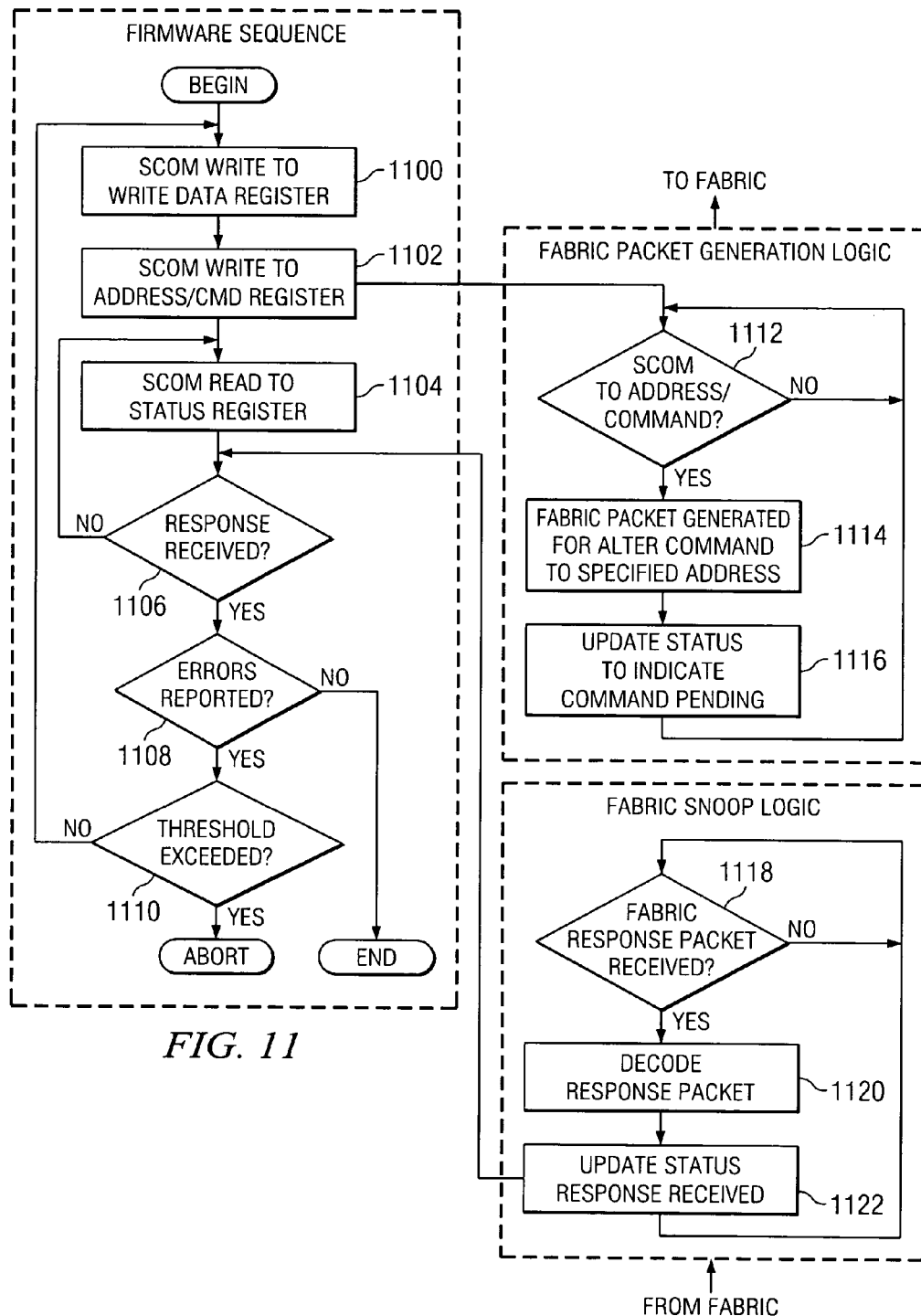
FIG. 11 depicts an exemplary indirect alter command flow in accordance with a preferred embodiment of the present invention.

With reference now to FIG. 11, an exemplary alter command flow diagram is depicted in accordance with a preferred embodiment of the present invention. As the operation begins, firmware performs an SCOM write command to the Write Data Register in the alter/display logic (block 1100) corresponding to 1002 from FIG. 10, with data ultimately intended for a memory, or a memory-mapped register or resource somewhere else in the system. Firmware then performs an SCOM write command to the Address/Command register in the alter/display logic (block 1102) corresponding to 1004 from FIG. 10, with the address of the ultimately intended memory-mapped register or resource, with the command field of the register specified as a write command. Fabric packet generation logic monitors for an SCOM write to the alter/display address/command (block 1112). If not, the fabric packet generation logic waits for another write.

In response to the SCOM write to the address/command register, fabric packet generation logic generates a fabric packet from write data register and the address/command register (block 1114) for a write-type command. Upon generation of the packet, the fabric packet generation logic initiates the fabric packet on the coherency fabric and updates the status register (1008 from FIG. 10) to indicate that the fabric packet has been sent (block 1116). The generated fabric packet thus contains the address and data for the ultimately targeted memory or memory-mapped register or resource to be written.

Returning to block 1102, as the fabric packet is being generated, the firmware performs a SCOM read of the status register for the status of the write command (block 1104). At block 1106, a determination is made to see if a response has been received. If a response has not been received, the operation returns to block 1104. While this determination is being performed, fabric snoop logic monitors the coherency fabric for a response (block 1118). If a response is not received, the operation continues to monitor the coherency fabric. If a response is received, the fabric snoop logic decodes the response for fabric packets previously sent by fabric packet generation logic (block 1120). Fabric snoop logic then updates the status register to indicate that the response packet has been received (block 1122).

Returning to block 1106, if the determination now indicates that a response has been received, then a determination is made as to any errors being reported (block 1108). If errors are reported, a determination is made as to whether an error threshold has been exceeded (block 1110). If the threshold has not been exceeded, the entire write command sequence is retried from the beginning. If the threshold is exceeded, the command is aborted and the operation ends. Returning to block 1108, if no errors are reported, the command is finished and the operation ends.

Figure 12:
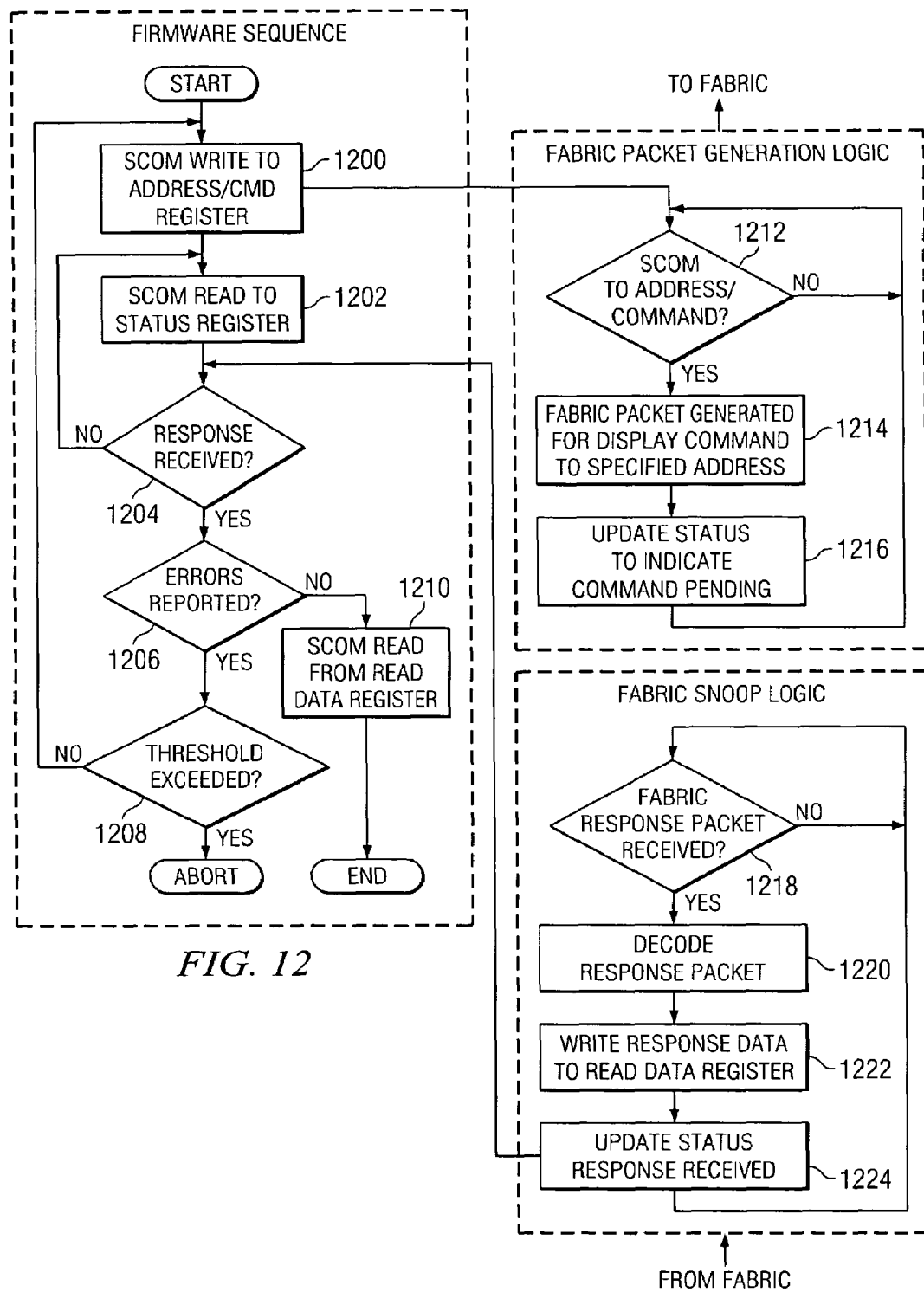
FIG. 12 depicts an exemplary indirect display command flow in accordance with a preferred embodiment of the present invention.

With reference now to FIG. 12, an exemplary display command flow diagram is depicted in accordance with a preferred embodiment of the present invention. As the operation begins, firmware performs an SCOM write command to the Address/Command register in the alter/display logic (block 1200) corresponding to 1004 from FIG. 10, with the address of the ultimately intended memory-mapped register or resource, with the command field of the register specified as a read command. Fabric packet generation logic monitors for an SCOM write to the alter/display address/command (block 1212). If not, the fabric packet generation logic waits for another write.

In response to the SCOM write to the address/command register, fabric packet generation logic generates a fabric packet from the address/command register (block 1214) for a read-type command. Upon generation of the packet, the fabric packet generation logic initiates the fabric packet on the coherency fabric and updates the status register (1008 from FIG. 10) to indicate that the fabric packet has been sent (block 1216). The generated fabric packet thus contains the address for the ultimately targeted memory or memory-mapped register or resource to be read.

Returning to block 1200, as the fabric packet is being generated, firmware performs a SCOM read of the status register for the status of the read command (block 1202). At block 1204 a determination is made to see if a response has been received. If a response has not been received, the operation returns to block 1202. While this determination is being performed, fabric snoop logic monitors the coherency fabric for a response (block 1218). If a response is not received, the operation continues to monitor the coherency fabric. If a response is received, the fabric snoop logic decodes the response (block 1220) and writes the response data to read data register (block 1222) corresponding to 1006 of FIG. 10. Fabric snoop logic then updates the status register to indicate that the response packet has been received (block 1224).

Returning to block 1204, if the determination now indicates that a response has been received, then a determination is made as to any errors being reported (block 1206). If errors are reported, a determination is made as to whether an error threshold has been exceeded (block 1208). If the threshold was not exceeded, the entire read command sequence is retried from the beginning. If the threshold was exceeded, the command is aborted and the operation ends. Returning to block 1206, if no errors are reported, firmware performs a SCOM read of the read data register (block 1210) and the operation ends.

Figure 13:
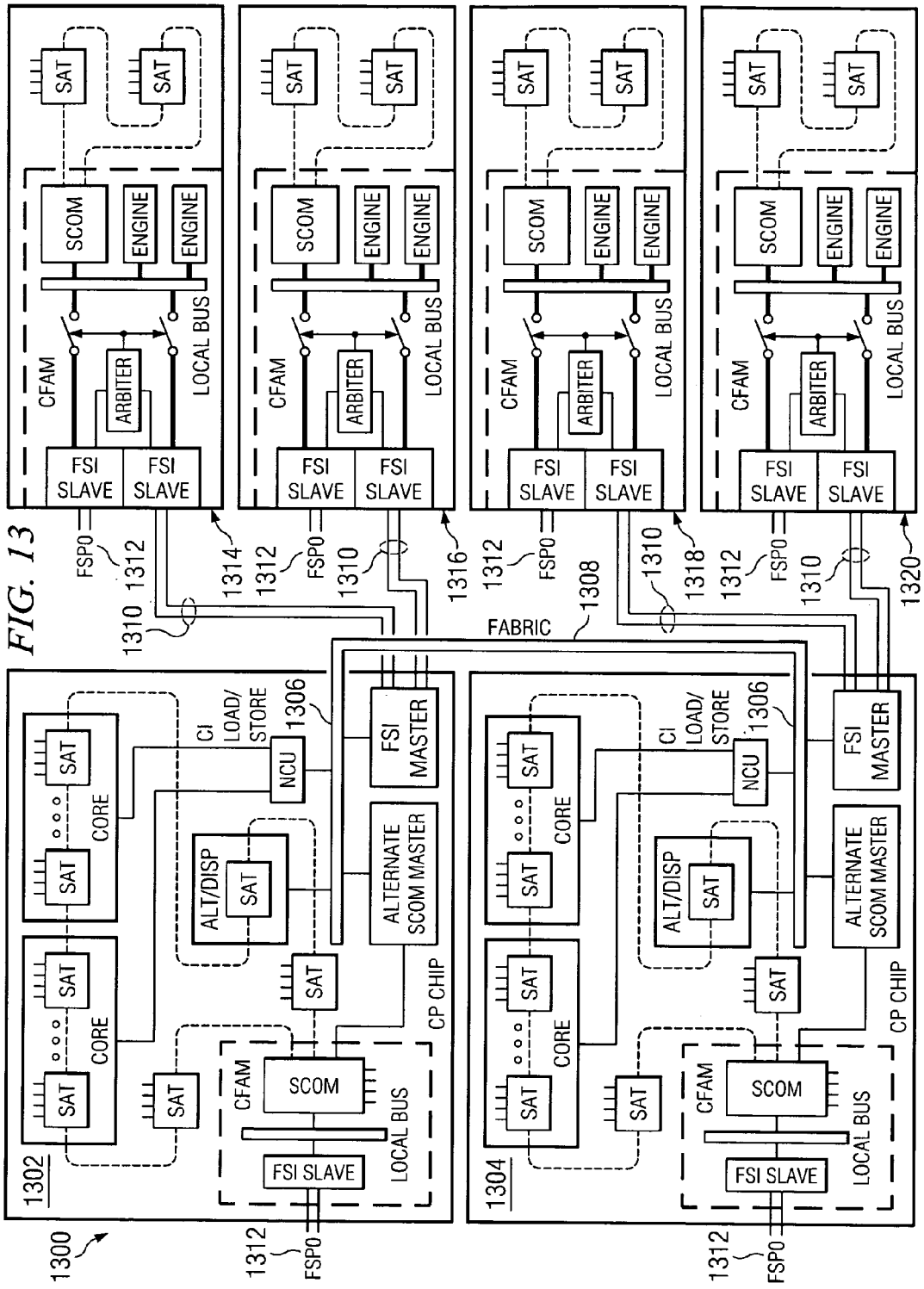
FIG. 13 is an exemplary connectivity of various chips in accordance with a preferred embodiment of the present invention.

Turning to FIG. 13, an illustrative example of an exemplary connectivity of various chips 1300 is depicted in accordance with a preferred embodiment of the present invention. The depicted connectivity 1300 shows connections between processor chips 1302 and 1304 and support chips 1314, 1316, 1318 and 1320. Some details of the internal CFAM functions not pertinent to the examples are omitted to reduce clutter in FIGS. 13-17. Fabric connection 1308 connects processor chip 1302 to processor chip 1304 through coherency fabric ports 1306, which relates to on and off-node fabric expansion ports 120 of FIG. 1. Processor chips 1302 and 1304 may be on the same or different nodes or planes. Additionally, support chips 1314, 1316, 1318 and 1320 are connected to processor chips 1302 and 1304 through a FSI master/slave connection 1310. Although not shown, processor chips 1302 and 1304 and support chips 1314, 1316, 1318 and 1320 are also connected to the support processor 502 of FIG. 5 through the FSI support processor connections (FSPO) 1312.

Figure 14:
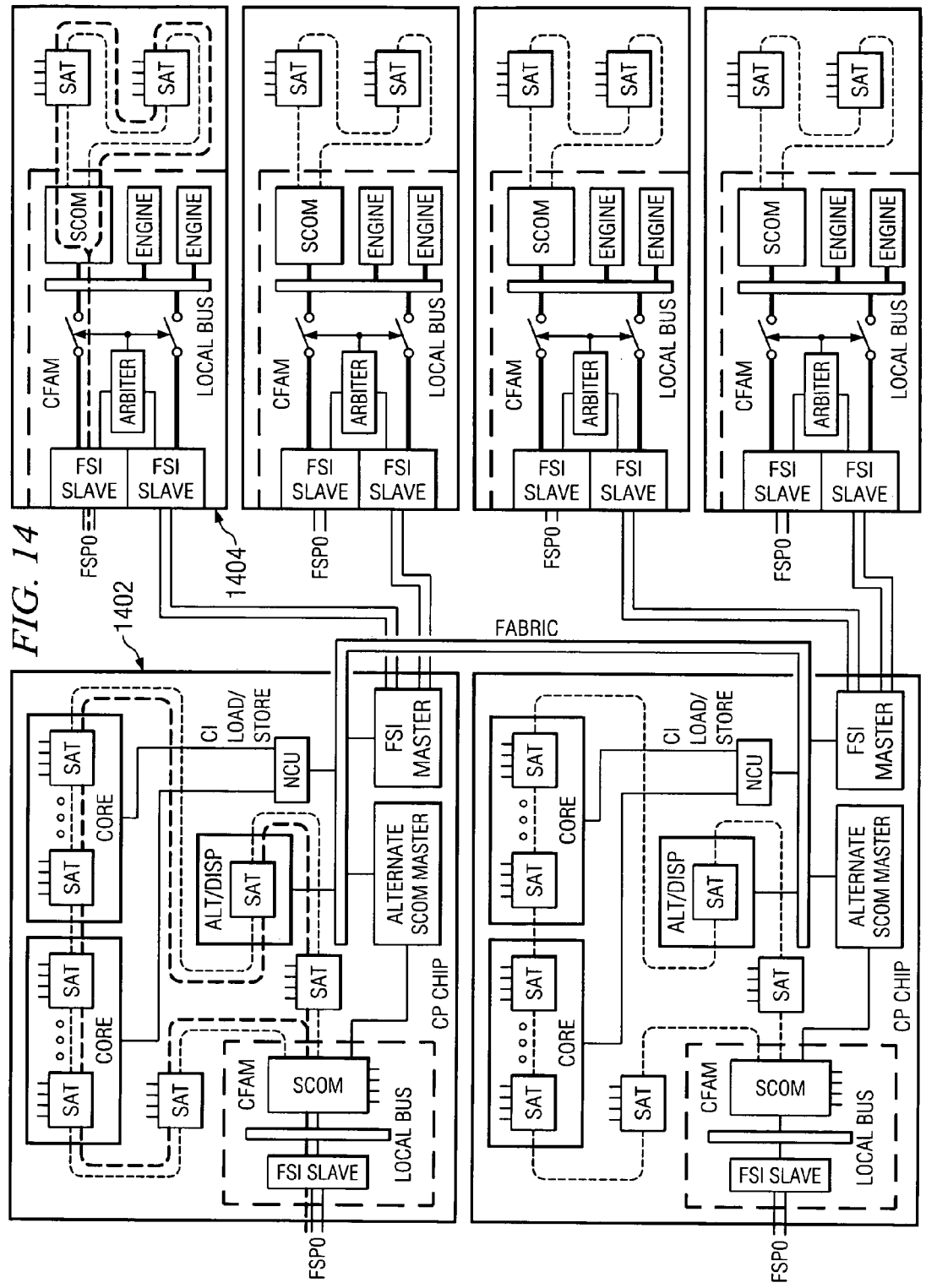
FIG. 14 depicts a method where the registers are accessed directly from the support processor (out-of-band) in accordance with a preferred embodiment of the present invention.

FIG. 14 depicts a method where the registers are accessed directly from the support processor (out-of-band) in accordance with a preferred embodiment of the present invention. In this preferred embodiment, a command, indicated by the darker dashed line, is issued to update a register directly from the support processor. In processor chip 1402, the command flows in the FSI port from the support processor to the SCOM controller. The SCOM controller performs the SCOM access by forwarding the read/write command, target register address, and data if a write command serially through every on-chip satellite until the register that the command is issued for is recognized and accessed by the satellite. The satellite forwards status and data if a read command, serially back to the SCOM controller. The SCOM controller then returns the FSI response to the support processor. Similarly, in support chip 1404, the command flows in the FSI port from the support processor to the SCOM controller, which performs the SCOM access and returns the FSI response to the support processor.

Figure 15:
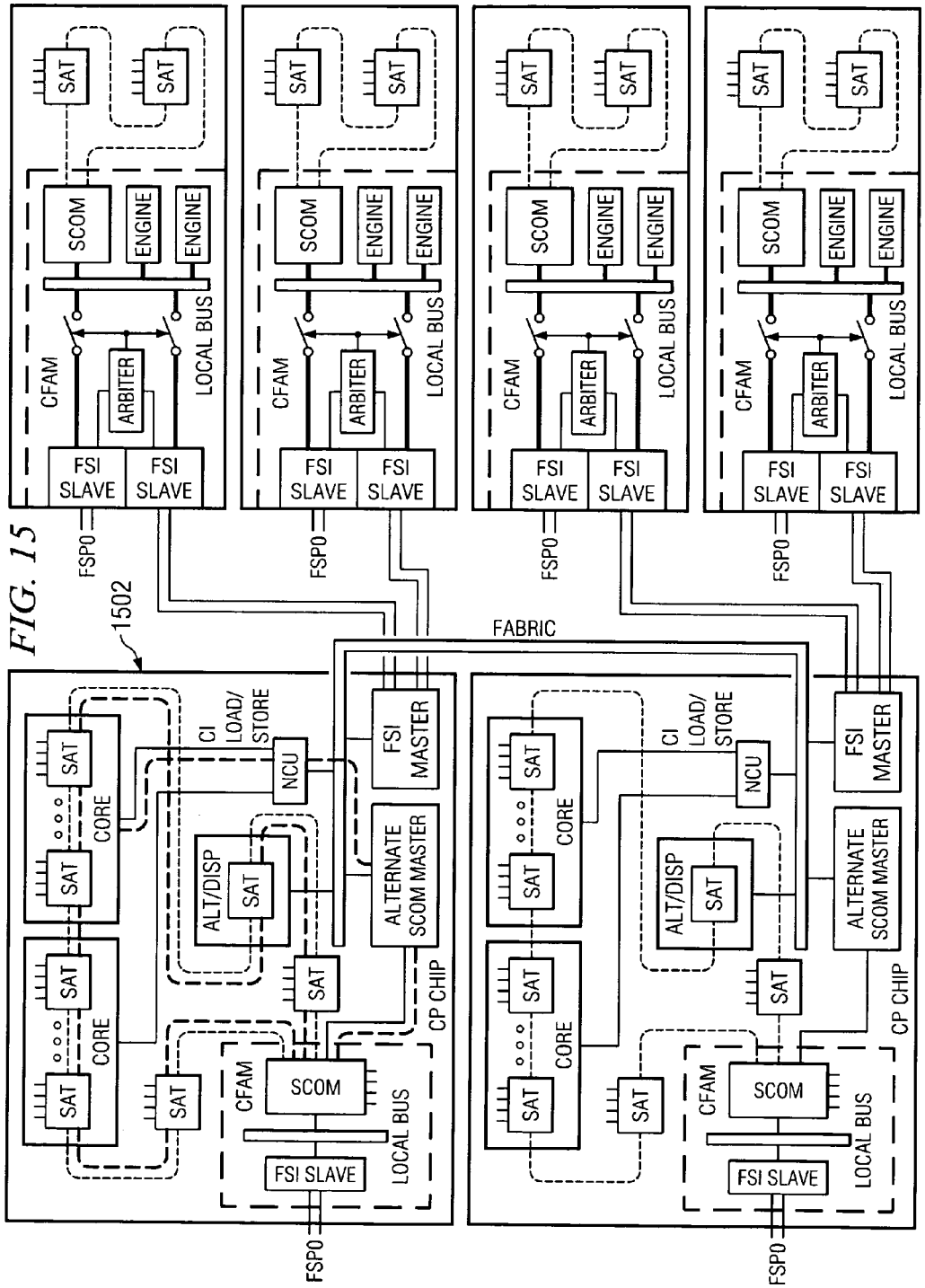
FIG. 15 depicts a method where registers local to the processor chip are accessed by a core on the same processor chip (in-band) via the non-cacheable unit in accordance with a preferred embodiment of the present invention.

FIG. 15 depicts a method where registers local to the processor chip are accessed by one of the processor cores on the same chip in accordance with a preferred embodiment of the present invention. In this preferred embodiment, a cache-inhibited load or store command, indicated by the darker dashed line, is issued by a processor core of processor chip 1502 to the non-cacheable unit (NCU), for a memory-mapped register which is on the same chip. The NCU then issues a command onto the coherency fabric which is picked up by the alternate SCOM master on the same chip and passed to the SCOM controller of the CFAM. The SCOM controller performs the SCOM access and forwards the response, and data if a read command, back the through the alternate SCOM master, fabric, and NCU to the originating core.

Figure 16:
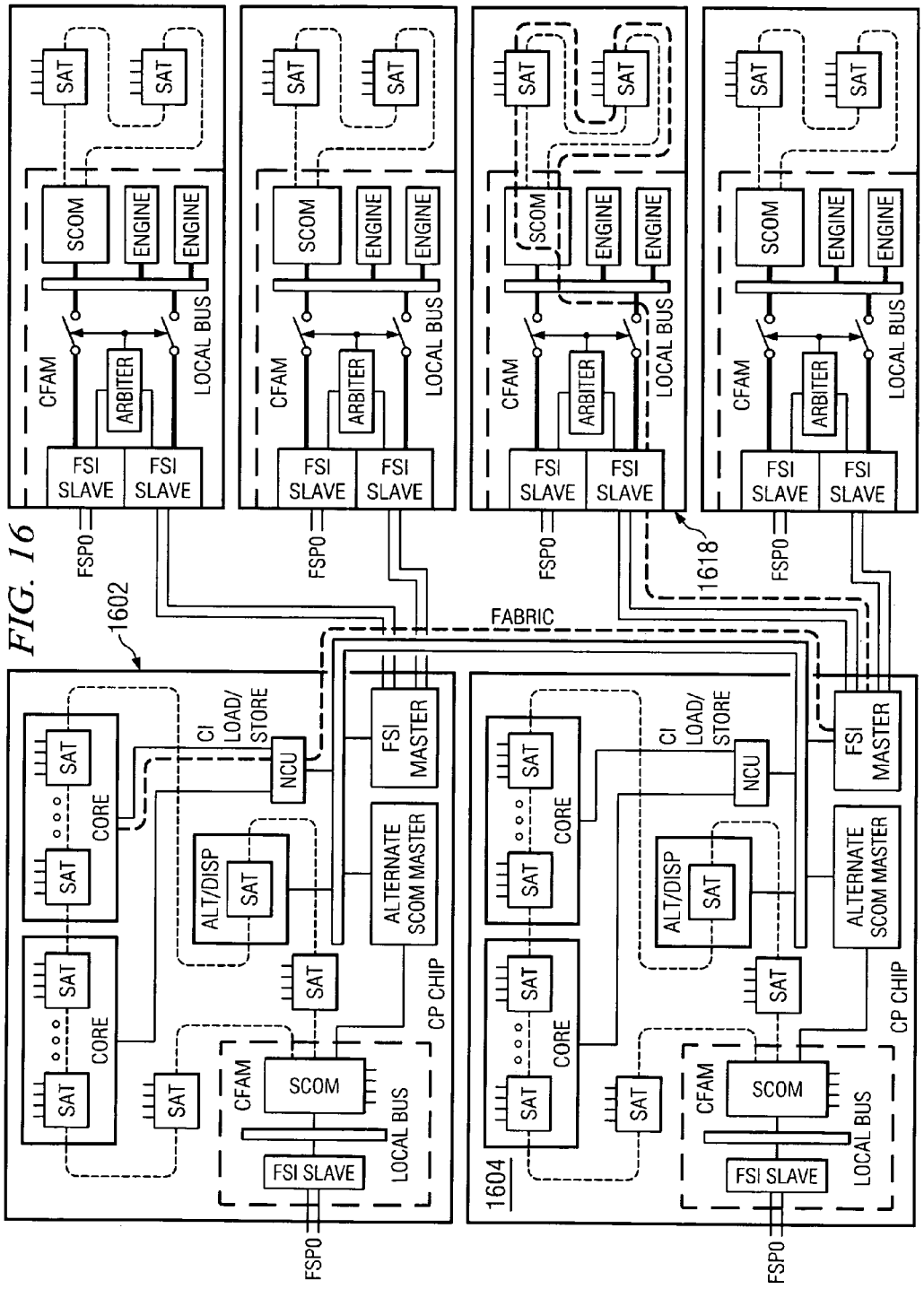
FIG. 16 is a method where registers on a remote support chip are accessed by a core on a processor chip (in-band) via the non-cacheable unit, coherency fabric, and FSI master, in accordance with a preferred embodiment of the present invention.

FIG. 16 depicts a method where registers on a remote support chip are accessed by a core on a processor chip (in-band) in accordance with a preferred embodiment of the present invention. In this preferred embodiment, a cache-inhibited load or store command, indicated by the darker dashed line, is issued from a processor core to the non-cacheable unit (NCU) of processor chip 1602. The NCU then issues a command that flows through the coherency fabric of processor chip 1602 to the coherency fabric of processor chip 1604. Then the command flows through the FSI master of processor chip 1604 to the FSI slave in the CFAM of support chip 1618. The FSI slave gives the command to the SCOM controller in the CFAM which performs the SCOM access to the target register in support chip 1618. The response for the SCOM command flows back through the FSI interface, the FSI master, the coherency fabric, and the NCU back to the originating core in processor chip 1602.

Figure 17:
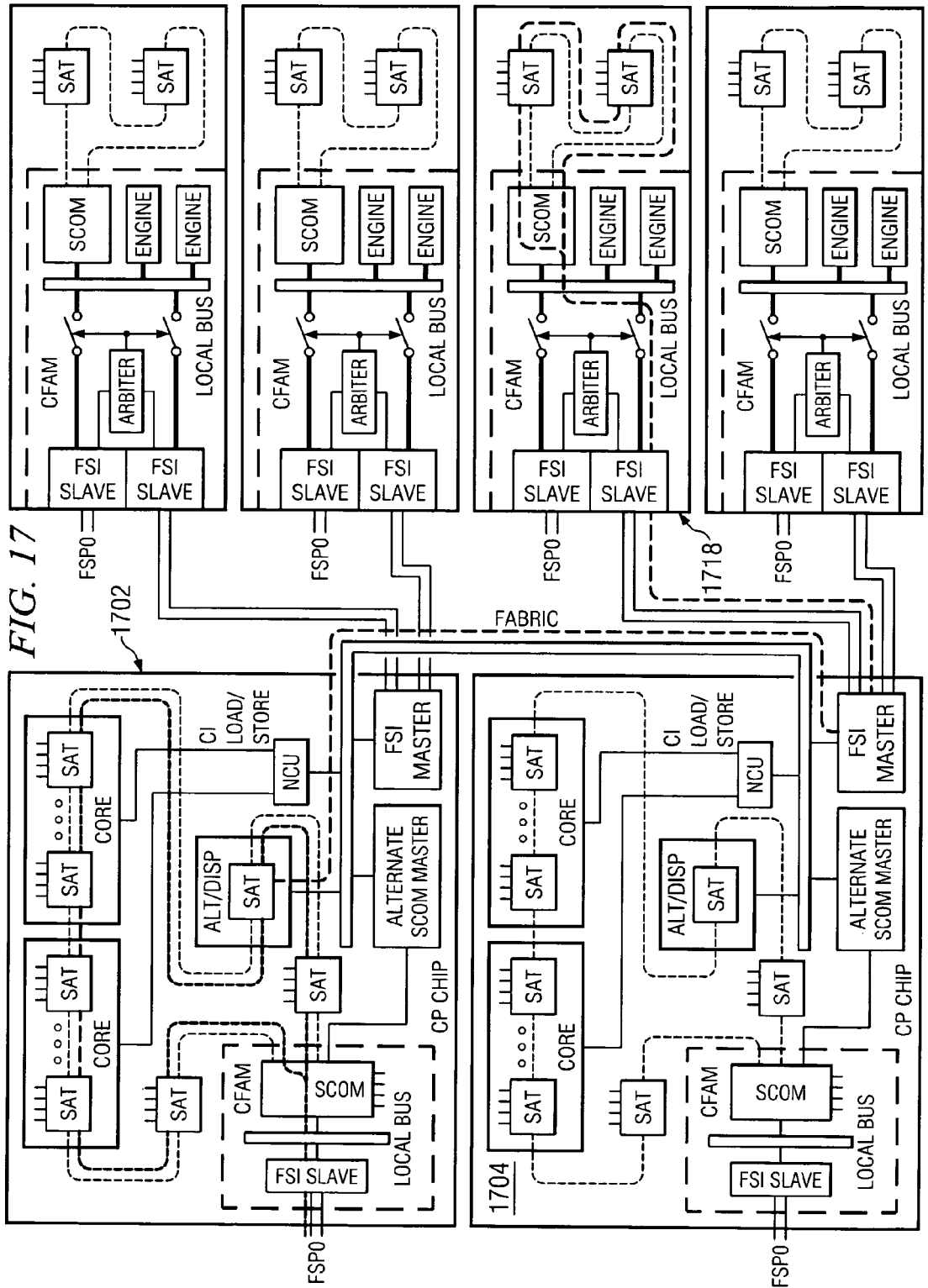
FIG. 17 is a method where registers on a remote support chip are accessed from the support processor (out-of-band) via the alter/display logic, coherency fabric, and FSI master, in accordance with a preferred embodiment of the present invention.

FIG. 17 depicts a method where registers on a remote support chip are accessed from the support processor (out-of-bound) indirectly via the alter/display logic in accordance with a preferred embodiment of the present invention. In this preferred embodiment, the support processor issues a sequence of SCOM writes, indicated by the medium dashed line, directly to registers in the alter/display logic of processor 1702 to target a memory-mapped register or resource anywhere in the system (register interface 1010 of FIG. 10). The alter/display logic generates a command, indicated by the darker dashed line, on the coherency fabric, similar to the NCU for a cache-inhibited load or store from a processor core. The command from the alter/display logic flows through the coherency fabric of processor chip 1702 to the coherency fabric of processor chip 1704. Then the command flows through the FSI master of processor chip 1704 to the FSI slave in the CFAM of support chip 1718. The FSI slave gives the command to the SCOM controller in the CFAM which performs the SCOM access to the target register in support chip 1718. The response for the SCOM command flows back through the FSI interface, the FSI master, and the coherency fabric, to the alter/display logic in processor chip 1702.

While the alter/display command is being performed, the support processor polls the alter/display status register via direct SCOM reads from the FSI interface to identify when the command has completed and when data is available for a read command. Note that the support processor may have to read the alter/display status register multiple times before it indicates the command is complete. The support processor may do other unrelated work in the meantime and come back at a later time to poll for status of the alter/display command. This is often referred to as "disconnected."

When the alter/display status indicates the command response has been received (command completed), the support processor can then read data returned for a read (display) command by performing a direct SCOM read of the read data register in the alter/display logic.

In summary, the present invention provides a method and apparatus for indirect access to a support interface for memory-mapped resources to reduce system connectivity from out-of-band support processor. The support interface is used to update memory, memory-mapped register or memory-mapped resources. The interface uses fabric packet generation logic to generate packets in a protocol for the coherency fabric which issues command packets and response packets that consists of an address, command and/or data. Fabric snoop logic monitors the coherency fabric and decodes responses for packets previously sent by fabric packet generation logic. The fabric snoop logic updates status register and/or writes response data to a read data register. The system also reports any errors that are encountered.

The fact that commands are propagated throughout the system using the coherency fabric means that any resource which is addressable from the coherency fabric is accessible via the FSI and alt/display. The coherency fabric is primarily used to access memory, which is why any memory mapped resource is accessible from it.

The examples in FIGS. 13-17 show how the SCOM controller is accessed by the different paths, but it should be noted that the registers in the register interfaces of the various optional engines in CFAM can also be memory mapped, and therefore accessible via the described methods.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for indirect access from a support processor to memory-mapped resources on multiple support chips, the method comprising:

receiving an input to the data processing system from the support processor into one or more input registers using a first field replaceable unit support interface, wherein the input is across multiple separate transfers on the first field replaceable unit support interface, and wherein the support processor performs other unrelated processing between the multiple separate transfers on the first field replaceable unit support interface;

responsive to receiving the input, generating a command packet, wherein the command packet includes a command based on the input received, wherein the command is comprised of an address specifying a target for the command and one of a read command and a write command, wherein the write command includes data, and wherein generating the command packet is performed by coherency fabric generation logic;

initiating the command packet on a bus, wherein the bus is a coherency fabric bus structure;

updating first bits in a status register in the data processing system to indicate that the command packet has been sent but a response packet has not yet been received;

forwarding the command packet to a support chip using one or more transfers on a second field replaceable unit support interface;

processing the command on the support chip;

responding to the command from the support chip using the second field replaceable unit support interface;

generating the response packet with the response from the support chip, wherein the command packet and the response packet are both coherency fabric packets, and wherein multiple command and response packets may be active on the bus at the same time from different sources to the same or different targets;

monitoring the bus for a response packet by a coherency fabric snoop logic;

receiving the response packet;

writing response data from the response packet to a data register;

updating second bits in the status register in the data processing system to indicate that the response packet has been received and the response data is available for the read command, wherein updating the second bits in the status register includes reporting any error indicated in the response packet;

monitoring the second bits in the status register by the support processor using the multiple separate transfers on the first field replaceable unit support interface; and accessing register values for the response data by the support processor using the multiple separate transfers on the first field replaceable unit support interface.

* * * * *